(12) United States Patent
Jiang et al.

(10) Patent No.: US 11,314,844 B1
(45) Date of Patent: Apr. 26, 2022

(54) INCREMENTAL SINGULAR VALUE DECOMPOSITION IN SUPPORT OF MACHINE LEARNING

(71) Applicant: SAS Institute Inc., Cary, NC (US)

(72) Inventors: Hansi Jiang, Cary, NC (US); Arin Chaudhuri, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/504,634

(22) Filed: Oct. 19, 2021

Related U.S. Application Data

(60) Provisional application No. 63/180,300, filed on Apr. 27, 2021, provisional application No. 63/160,164, filed on Mar. 12, 2021.

(51) Int. Cl.
*G06F 17/16* (2006.01)

(52) U.S. Cl.
CPC .................... *G06F 17/16* (2013.01)

(58) Field of Classification Search
CPC ........................................... G06F 17/16
USPC ........................................... 708/520
See application file for complete search history.

(56) References Cited

U.S. PATENT DOCUMENTS

| 8,510,364 | B1 * | 8/2013 | Rao | G06F 17/12 708/522 |
|---|---|---|---|---|
| 10,157,319 | B2 | 12/2018 | Xiao et al. | |
| 10,489,481 | B1 * | 11/2019 | Batruni | G06F 17/16 |
| 2016/0299874 | A1 * | 10/2016 | Liao | G06F 17/16 |
| 2019/0326962 | A1 * | 10/2019 | Jin | H04B 7/0478 |
| 2020/0183769 | A1 * | 6/2020 | Poghosyan | G06F 11/0709 |

OTHER PUBLICATIONS

Meyer CD (2000) Matrix analysis and applied linear algebra, Section 7.3 Functions of Diagonalizable Matrices. p. 533-534, Example 7.3.7, Power Method.
Bunch JR, Nielsen CP (1978) Updating the singular value decomposition. Numerische Mathematik 31(2):111-129.
Iwen et al., "A Distributed and Incremental SVD Algorithm for Agglomerative Data Analysis on Large Networks," arXiv:1601.07010v2 [math.Na] Jun. 29, 2016.
Stor et al., "Accurate eigenvalue decomposition of arrowhead matrices and applications," arXiv:1302.7203v3 [math.NA] Apr. 11, 2013.

* cited by examiner

*Primary Examiner* — Tan V Mai
(74) *Attorney, Agent, or Firm* — Bell & Manning, LLC

(57) ABSTRACT

A singular value decomposition (SVD) is computed of a first matrix to define a left matrix, a diagonal matrix, and a right matrix. The left matrix, the diagonal matrix, and the right matrix are updated using an arrowhead matrix structure defined from the diagonal matrix and by adding a next observation vector to a last row of the first matrix. The updated left matrix, the updated diagonal matrix, and the updated right matrix are updated using a diagonal-plus-rank-one (DPR1) matrix structure defined from the updated diagonal matrix and by removing an observation vector from a first row of the first matrix. Eigenpairs of the DPR1 matrix are computed based on whether a value computed from the updated left matrix is positive or negative. The left matrix updated in (C), the diagonal matrix updated in (C), and the right matrix updated in (C) are output.

30 Claims, 17 Drawing Sheets

US 11,314,844 B1

INCREMENTAL SINGULAR VALUE DECOMPOSITION IN SUPPORT OF MACHINE LEARNING

CROSS-REFERENCE TO RELATED APPLICATIONS

The present application claims the benefit of and priority under 35 U.S.C. § 119(e) to U.S. Provisional Patent Application No. 63/180,300 filed on Apr. 27, 2021, and to U.S. Provisional Patent Application No. 63/160,164 filed on Mar. 12, 2021, the entire contents of which are hereby incorporated by reference.

BACKGROUND

Singular value decomposition (SVD) lies at the root of numerous aspects of data analysis. SVD factorizes a matrix A into $A=U\Sigma V^T$, where U and V are orthogonal matrices and $\Sigma$ is a rectangular diagonal matrix with nonnegative values on its diagonal. SVD is a fundamental part of principal component analysis (PCA) that performs dimension reduction and extracts the important information from data. SVD also provides the mathematical basis of many machine learning applications, such as recommending systems, prediction models, classification models, signal processing, text mining, etc. Run time improvements to SVD then directly improve the computer run time for PCA and machine learning model training.

SUMMARY

In an example embodiment, a non-transitory computer-readable medium is provided having stored thereon computer-readable instructions that, when executed by a computing device, cause the computing device to compute a singular value decomposition of a matrix. A singular value decomposition (SVD) is computed of a first matrix to define a left matrix, a diagonal matrix, and a right matrix. The first matrix is defined as $A=U\Sigma V^T$, where A is the first matrix, U is the left matrix, V is the right matrix, $\Sigma$ is the diagonal matrix, T indicates a transpose, A has dimension $N_I \times N_v$, U has dimension $N_I \times N_v$, V has dimension $N_v \times N_v$, $\Sigma$ has dimension $N_v \times N_v$, $N_I$ is a predefined number of initialization observation vectors used to compute the SVD of the first matrix, and $N_v$ is a predefined number of variables of a plurality of variables that define each observation vector. (A) A next observation vector is selected from an event stream or from a second plurality of observation vectors. (B) The left matrix, the diagonal matrix, and the right matrix are updated using an arrowhead matrix structure defined from the diagonal matrix and based on adding the selected next observation vector to a last row of the first matrix. (C) The updated left matrix, the updated diagonal matrix, and the updated right matrix are updated using a diagonal-plus-rank-one (DPR1) matrix structure defined from the updated diagonal matrix and based on removing an observation vector from a first row of the first matrix. Eigenpairs of the DPR1 matrix are computed based on whether a value computed from the updated left matrix is positive or negative. (D) The left matrix updated in (C), the diagonal matrix updated in (C), and the right matrix updated in (C) are output. (A) through (D) are repeated until the event stream is stopped or a last observation vector is selected from the second plurality of observation vectors in (A).

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to compute a singular value decomposition of a matrix.

In yet another example embodiment, a method of computing a singular value decomposition of a matrix is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Interest in incremental singular value decomposition (ISVD) is increasing because ISVD is well suited to streaming data. Again, SVD factorizes a matrix A into $A=U\Sigma V^T$, where U and V are orthogonal matrices, $\Sigma$ is a rectangular diagonal matrix with nonnegative values on its diagonal, and T indicates a transpose. U may be referred to as a left matrix, V may be referred to as a right matrix. A has dimension $m \times N_v$, U has dimension $m \times r$, V has dimension $N_v \times r$, and $\Sigma$ has dimension $r \times r$.

An ISVD application 122 improves both efficiency and accuracy during computation. More specifically, ISVD application 122 takes advantage of the special structures of arrowhead and diagonal-plus-rank-one (DPR1) matrices that are involved in incrementally updating the SVD models to decrease the computation time required for the update process. Moreover, because the singular values are computed independently, ISVD application 122 can be parallelized to further decrease the computation time required for the update process. Increasing the rank of the decomposed matrices can lead to more accurate singular values in the updating process and is supported by the reduced computation times. Experimental results described herein from synthetic and real data sets demonstrate gains in efficiency and accuracy in the update process.

Figure 1:
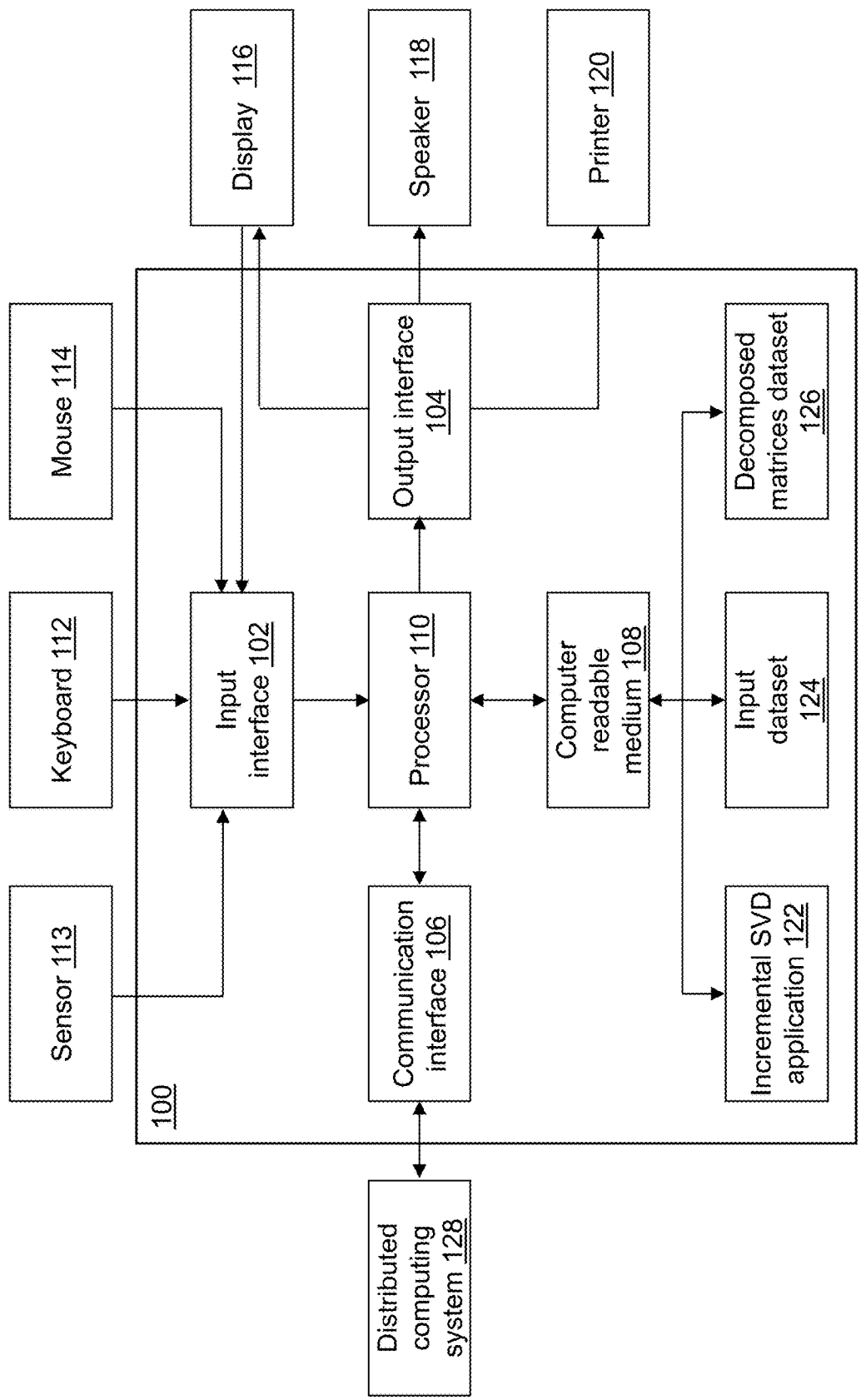
FIG. 1 depicts a block diagram of a data decomposition device in accordance with an illustrative embodiment.

Referring to FIG. 1, a block diagram of a data decomposition device 100 is shown in accordance with an illustrative embodiment. Data decomposition device 100 may include an input interface 102, an output interface 104, a communication interface 106, a non-transitory computer-readable medium 108, a processor 110, ISVD application 122, an input dataset 124, and a decomposed matrices input dataset 124. Fewer, different, and/or additional components may be incorporated into data decomposition device 100.

Input interface 102 provides an interface for receiving information from the user or another device for entry into data decomposition device 100 as understood by those skilled in the art. Input interface 102 may interface with various input technologies including, but not limited to, a keyboard 112, a mouse 114, a display 116, a track ball, a keypad, one or more buttons, etc. to allow the user to enter information into data decomposition device 100 or to make selections presented in a user interface displayed on display 116.

Input interface 102 may also interface with various input technologies such as a sensor 113. For example, sensor 113 may produce a sensor signal value referred to as a measurement data value that is representative of a measure of a physical quantity in an environment to which sensor 113 is associated and generate a corresponding measurement datum that may be associated with a time that the measurement datum is generated. The environment to which sensor 113 is associated for monitoring may include a power grid system, a telecommunications system, a fluid (oil, gas, water, etc.) pipeline, a transportation system, an industrial device, a medical device, an appliance, a vehicle, a computing device, a beehive, a person, a geographic location, etc. Example sensor types of sensor 113 include an acoustic sensor, a pressure sensor, a temperature sensor, a position or location sensor, a velocity sensor, an acceleration sensor, a fluid flow rate sensor, a voltage sensor, a current sensor, a frequency sensor, a phase angle sensor, a data rate sensor, a humidity sensor, a light sensor, a motion sensor, an electromagnetic field sensor, a force sensor, a torque sensor, a load sensor, a strain sensor, a chemical property sensor, a resistance sensor, a radiation sensor, an irradiance sensor, a proximity sensor, a distance sensor, a vibration sensor, etc. that may be mounted to various components used as part of the system.

The same interface may support both input interface 102 and output interface 104. For example, display 116 comprising a touch screen provides a mechanism for user input and for presentation of output to the user. Data decomposition device 100 may have one or more input interfaces that use the same or a different input interface technology. The input interface technology further may be accessible by data decomposition device 100 through communication interface 106.

Output interface 104 provides an interface for outputting information for review by a user of data decomposition device 100 and/or for use by another application or device. For example, output interface 104 may interface with various output technologies including, but not limited to, display 116, a speaker 118, a printer 120, etc. Data decomposition device 100 may have one or more output interfaces that use the same or a different output interface technology. The output interface technology further may be accessible by data decomposition device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Data decomposition device 100 may have one or more communication interfaces that use the same or a different communication interface technology. For example, data decomposition device 100 may support communication using an Ethernet port, a Bluetooth® antenna, a telephone jack, a USB port, etc. Data and messages may be transferred between data decomposition device 100 and another computing device of a distributed computing system 128 using communication interface 106.

Non-transitory computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Data decomposition device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Data decomposition device 100 also may have one or more drives that support the loading of a memory media such as a CD, DVD, an external hard drive, etc. One or more external hard drives further may be connected to data decomposition device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Data decomposition device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

ISVD application 122 performs operations associated with incrementally updating SVD matrices using observation vectors included in input dataset 124. For illustration, the updated SVD matrices may be used as part of principal component analysis of input dataset 124 and/or training of a machine learning model using the observation vectors included in input dataset 124. Some or all of the operations described herein may be embodied in ISVD application 122. The operations may be implemented using hardware, firmware, software, or any combination of these methods.

Referring to the example embodiment of FIG. 1, ISVD application 122 is implemented in software (comprised of computer-readable and/or computer-executable instructions) stored in computer-readable medium 108 and accessible by processor 110 for execution of the instructions that embody the operations of ISVD application 122. ISVD application 122 may be written using one or more programming languages, assembly languages, scripting languages, etc. ISVD application 122 may be integrated with other analytic tools. As an example, ISVD application 122 may be part of an integrated data analytics software application and/or software architecture such as that offered by SAS Institute Inc. of Cary, N.C., USA. For example, ISVD application 122 may be implemented using or integrated with one or more SAS software tools such as SAS® Enterprise Miner™, Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS® Event Stream Processing, all of which are developed and provided by SAS Institute Inc. of Cary, N.C., USA. Data mining is applicable in a wide variety of industries. For illustration, ISVD application 122 may be executed by a procedure such as MWPCA implemented as part of SAS® Viya™.

ISVD application 122 may be integrated with other system processing tools to automatically process data received through input interface 102 and/or communication interface 106 generated as part of operation of an enterprise, device, system, facility, etc. to monitor changes in the data that may be output using output interface 104 and/or communication interface 106 so that appropriate action can be initiated in response to changes in the monitored data.

ISVD application 122 may be implemented as a Web application. For example, ISVD application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input dataset 124 may include, for example, a plurality of rows and a plurality of columns. The plurality of rows may be referred to as observation vectors or records (observations), and the columns may be referred to as variables. The plurality of variables may define multiple dimensions for each observation vector. An observation vector $x_i$ may include a value for each of the plurality of variables associated with the observation i. All or a subset of the columns may be used as variables that define observation vector $x_i$. Each variable of the plurality of variables may describe a characteristic of a physical object.

The data stored in input dataset 124 may be generated by and/or captured from a variety of sources including one or more sensors of the same or different type, one or more computing devices, etc. The data stored in input dataset 124 may be received directly or indirectly from the source and may or may not be pre-processed in some manner. For example, the data may be pre-processed using an event stream processor such as SAS® Event Stream Processing. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

Input dataset 124 may be stored on computer-readable medium 108 or on one or more computer-readable media of distributed computing system 128 and accessed by data decomposition device 100 using communication interface 106, input interface 102, and/or output interface 104. Data stored in input dataset 124 may be continually received for processing by ISVD application 122. The data stored in input dataset 124 may include any type of content represented in any computer-readable format such as binary, alphanumeric, numeric, string, markup language, etc. The content may include sensor data, textual information, graphical information, image information, audio information, numeric information, etc. that further may be encoded using various encoding techniques as understood by a person of skill in the art. The data stored in input dataset 124 may be captured at different time points periodically, intermittently, when an event occurs, continuously, etc. One or more columns of input dataset 124 may include a time and/or date value.

Input dataset 124 may include data captured under normal operating conditions of the physical object. Input dataset 124 may include data captured at a high data rate such as 200 or more observations per second for one or more physical objects. For example, data stored in input dataset 124 may be generated as part of the IoT, where things (e.g., machines, devices, phones, sensors) can be connected to networks and the data from these things collected and processed within the things and/or external to the things before being stored in input dataset 124. For example, the IoT can include sensors, such as sensor 113, in many different devices and types of devices, and high value analytics can be applied to identify hidden relationships and drive increased efficiencies. This can apply to both big data analytics and real-time analytics. Some of these devices may be referred to as edge devices and may involve edge computing circuitry. These devices may provide a variety of stored or generated data, such as network data or data specific to the network devices themselves. Some data may be processed with an event stream processing engine (ESPE), which may reside in the cloud or in an edge device before being stored in input dataset 124.

Input dataset 124 may be stored using various data structures as known to those skilled in the art including one or more files of a file system, a relational database, one or more tables of a system of tables, a structured query language database, etc. on data decomposition device 100 or on distributed computing system 128. Data decomposition device 100 may coordinate access to input dataset 124 that is distributed across distributed computing system 128 that may include one or more computing devices. For example, input dataset 124 may be stored in a cube distributed across a grid of computers as understood by a person of skill in the art. As another example, input dataset 124 may be stored in a multi-node Hadoop® cluster. For instance, Apache™ Hadoop® is an open-source software framework for distributed computing supported by the Apache Software Foundation. As another example, input dataset 124 may be stored in a cloud of computers and accessed using cloud computing technologies, as understood by a person of skill in the art. The SAS® LASR™ Analytic Server may be used as an analytic platform to enable multiple users to concurrently access data stored in input dataset 124. The SAS® Viya™ open, cloud-ready, in-memory architecture also may be used as an analytic platform to enable multiple users to concurrently access data stored in input dataset 124. Some systems may use SAS In-Memory Statistics for Hadoop® to read big data once and analyze it several times by persisting it in-memory for the entire session. Some systems may be of other types and configurations.

Referring to FIGS. 2 through 7, example operations associated with ISVD application 122 are described. Additional, fewer, or different operations may be performed depending on the embodiment of ISVD application 122. The order of presentation of the operations of FIGS. 2 through 7 is not intended to be limiting. Although some of the operational flows are presented in sequence, the various operations may be performed in various repetitions, concurrently (in parallel, for example, using threads and/or distributed computing system 128), and/or in other orders than those that are illustrated. For example, a user may execute ISVD application 122, which causes presentation of a first user interface window, which may include a plurality of menus and selectors such as drop-down menus, buttons, text boxes, hyperlinks, etc. associated with ISVD application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by ISVD application 122.

Figure 2:
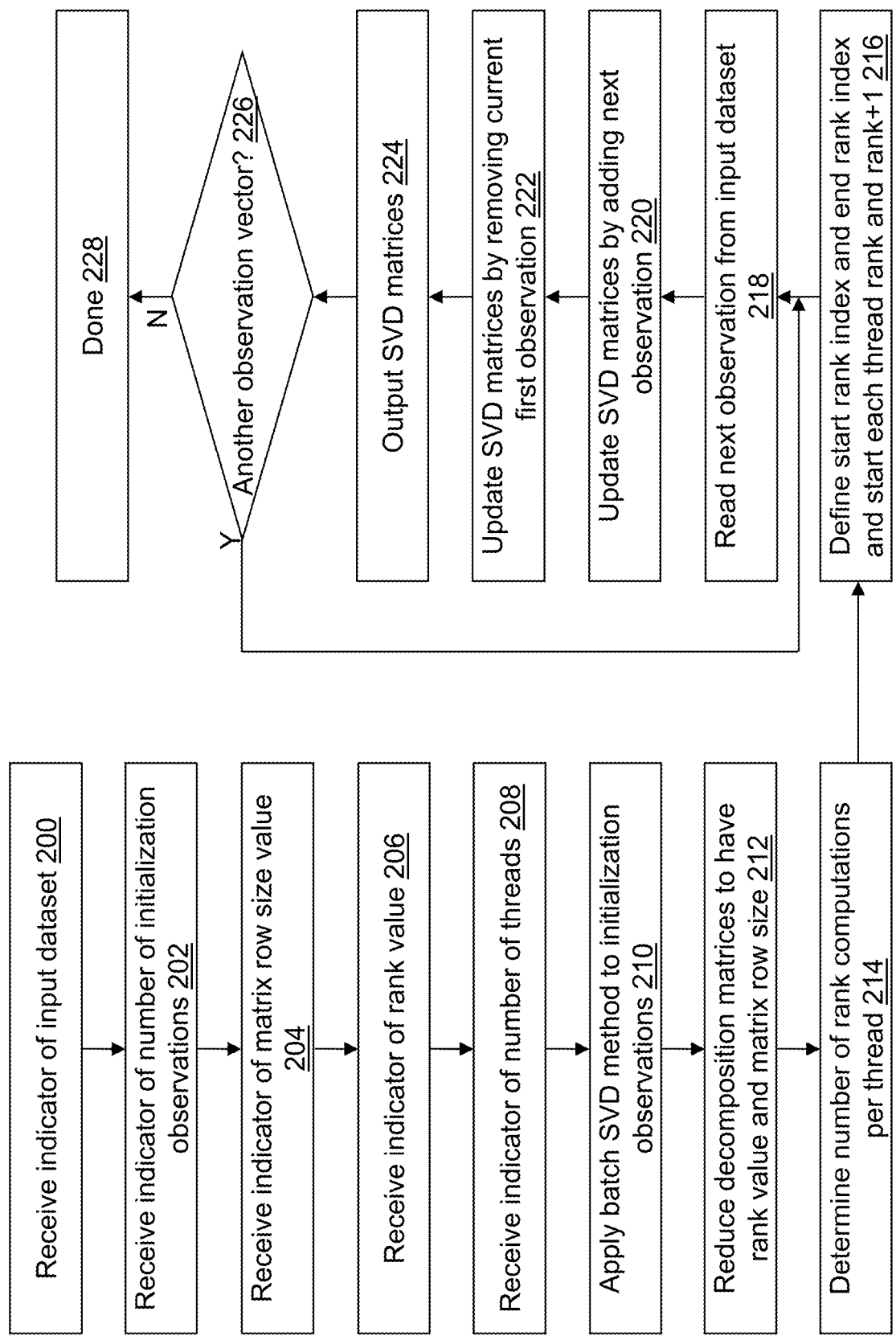
FIG. 2 depicts a flow diagram illustrating examples of operations for an incremental update of a singular value decomposition (SVD) performed by the data decomposition device of FIG. 1 in accordance with an illustrative embodiment.
Figure 3:
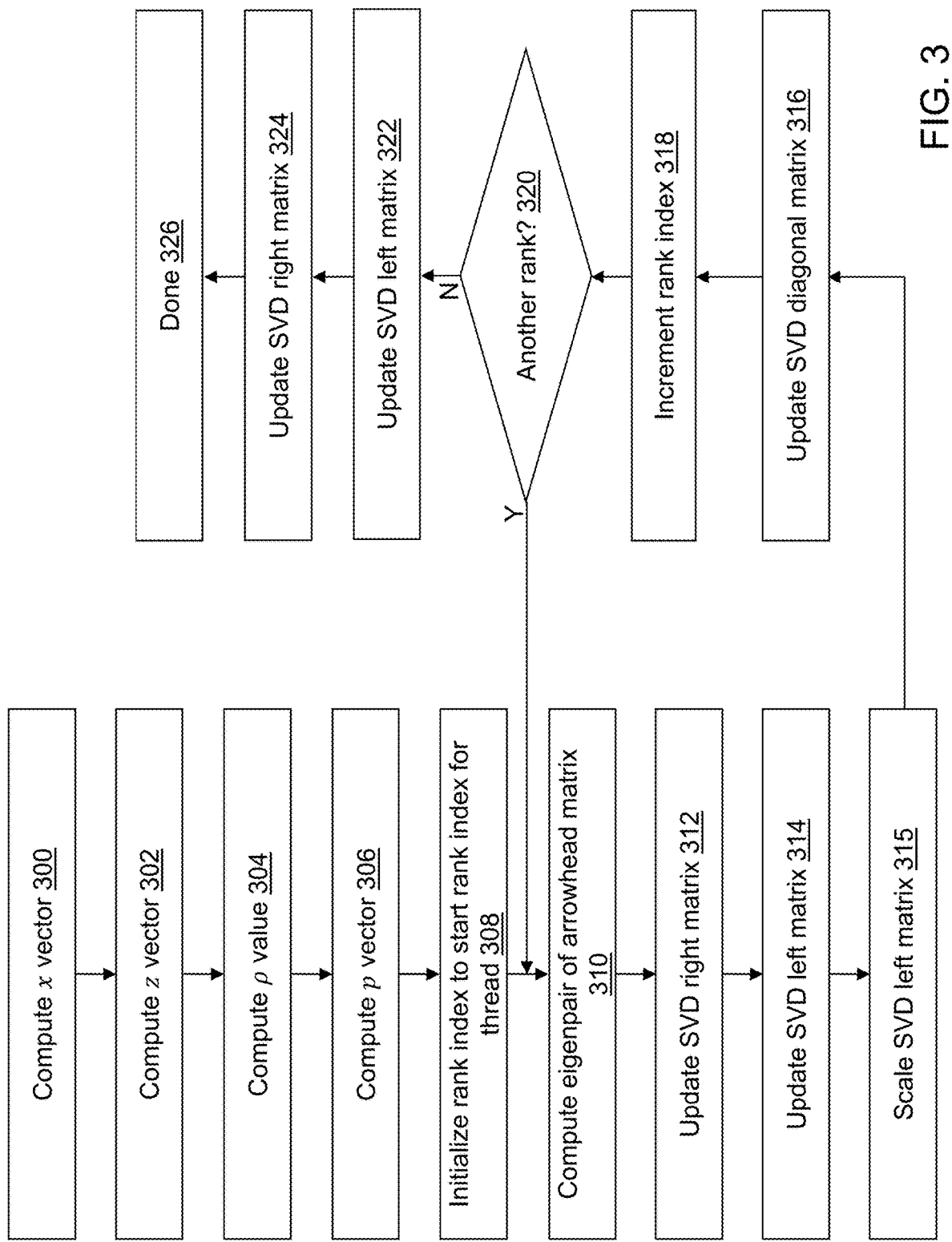
FIG. 3 depicts a flow diagram illustrating examples of row addition operations performed by the data decomposition device of FIG. 1 in accordance with an illustrative embodiment.
Figure 4:
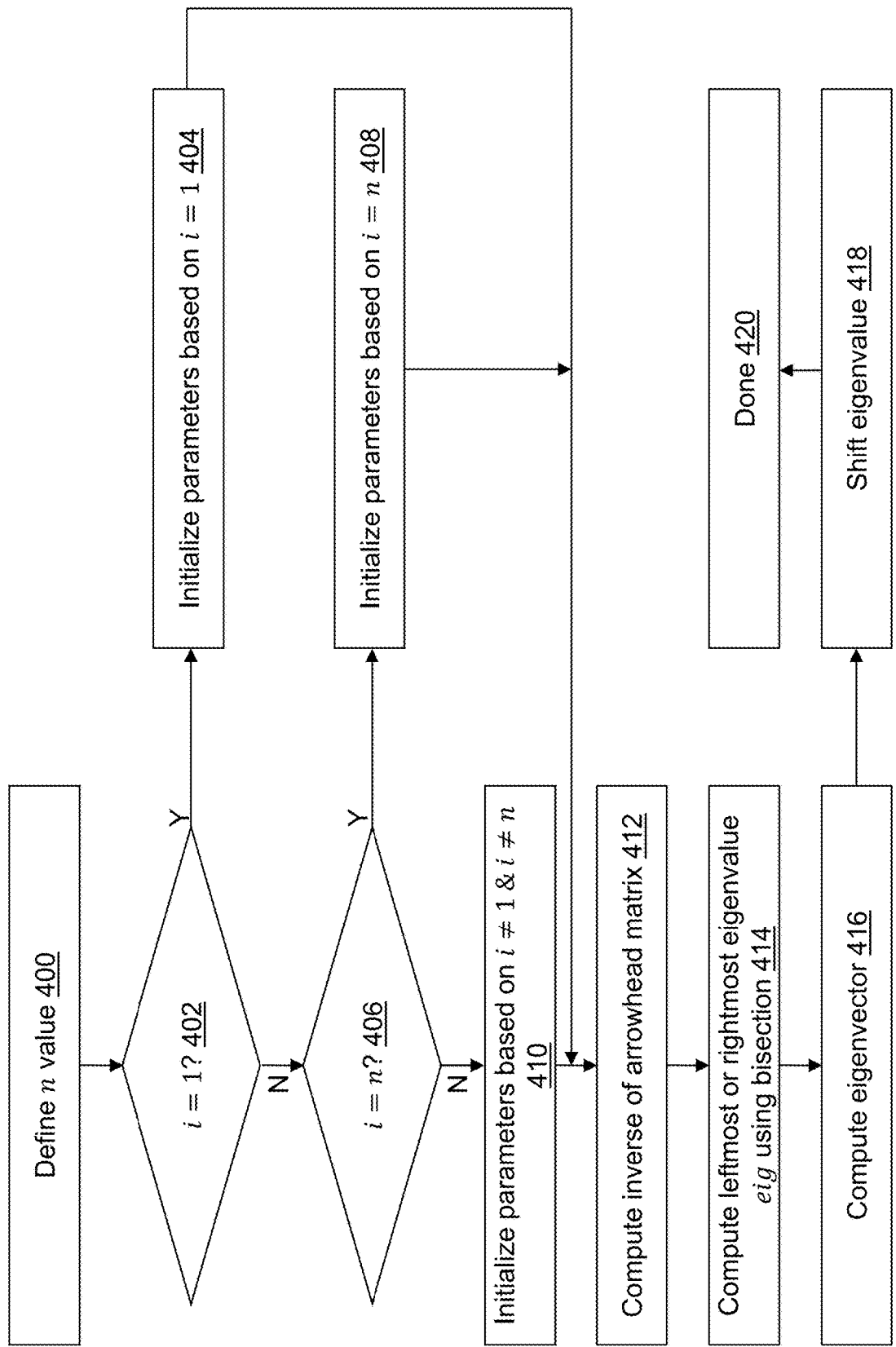
FIG. 4 depicts a flow diagram illustrating examples of eigenpair computation operations performed by the data decomposition device of FIG. 1 in accordance with an illustrative embodiment.
Figure 5:
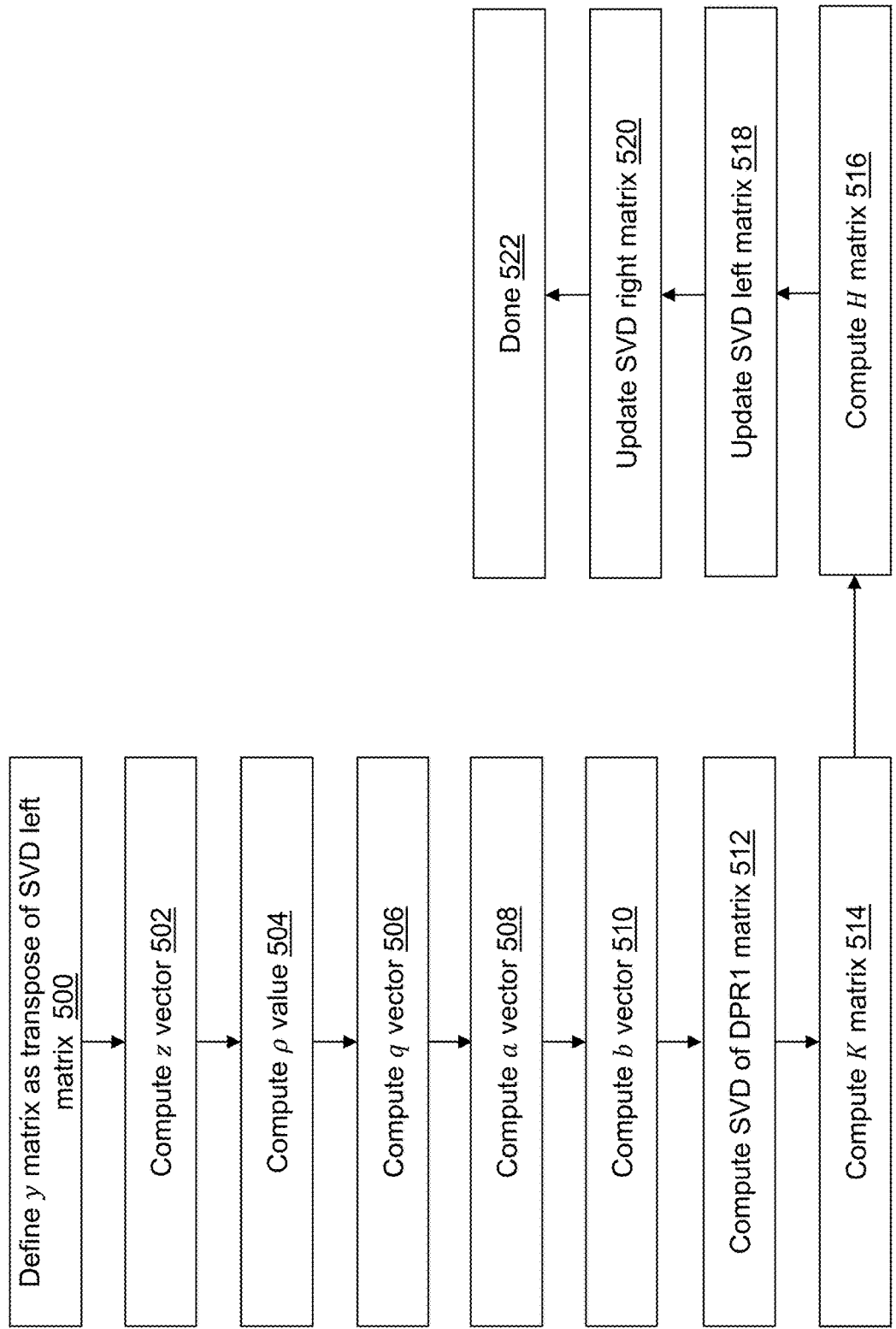
FIG. 5 depicts a flow diagram illustrating examples of row removal operations performed by the data decomposition device of FIG. 1 in accordance with an illustrative embodiment.
Figure 6:
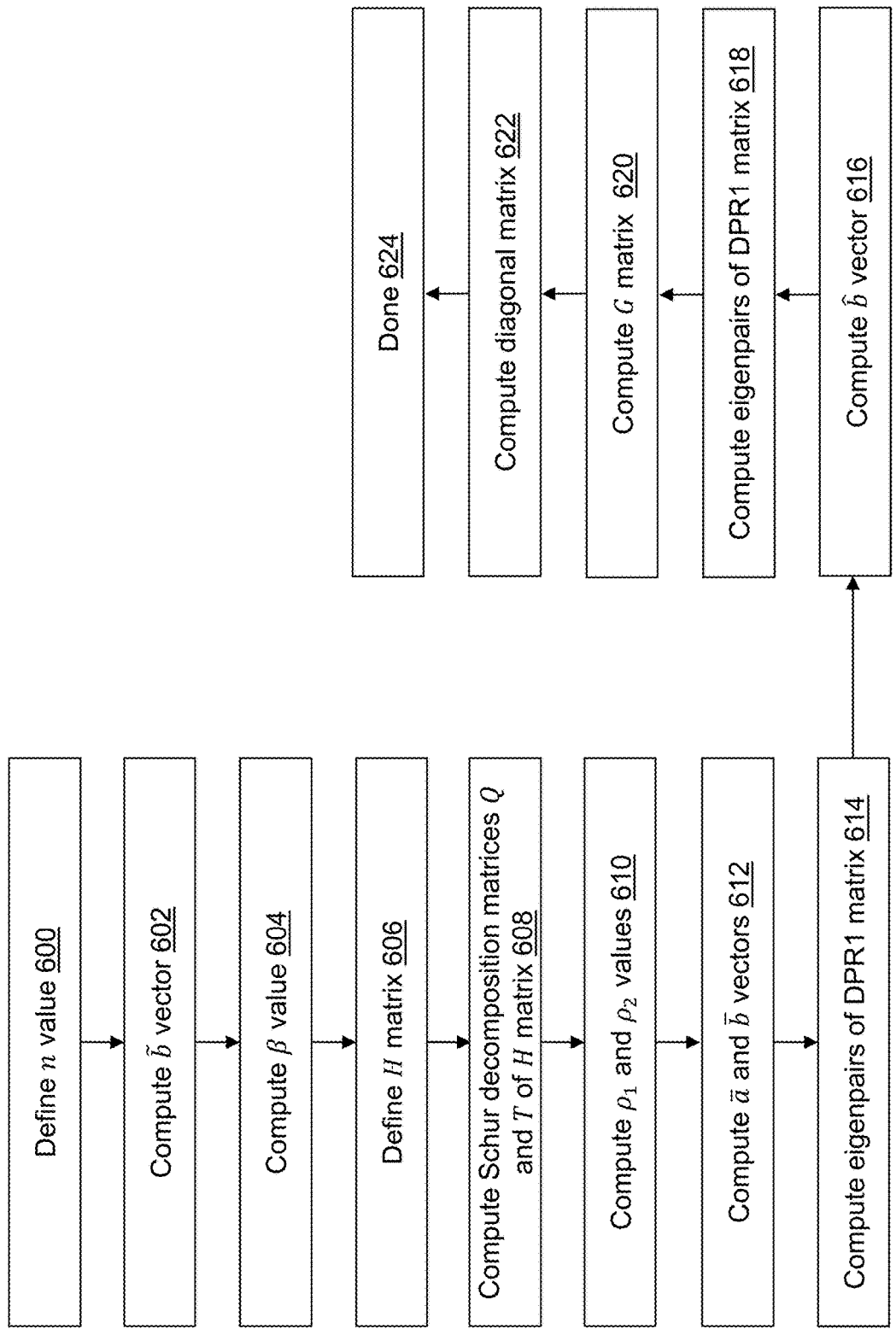
FIG. 6 depicts a flow diagram illustrating examples of operations to compute an SVD for a diagonal-plus-rank-one (DPR1) matrix computation performed by the data decomposition device of FIG. 1 in accordance with an illustrative embodiment.
Figure 7:
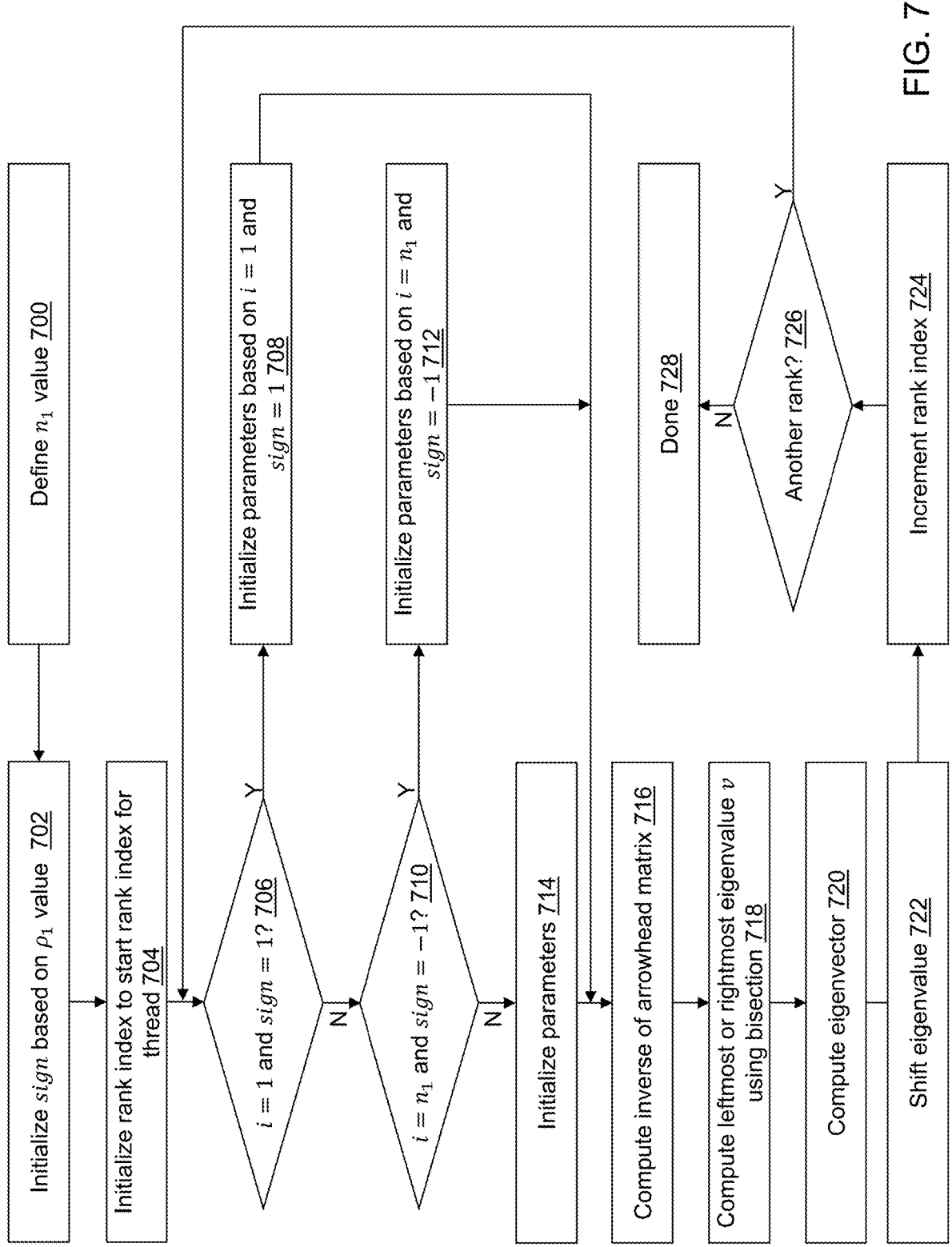
FIG. 7 depicts a flow diagram illustrating further examples of operations to compute an SVD for the DPR1 matrix computation performed by the data decomposition device of FIG. 1 in accordance with an illustrative embodiment.

Referring to FIG. 2, in an operation 200, a first indicator may be received that indicates input dataset 124. For example, the first indicator indicates a location and a name of input dataset 124. As an example, the first indicator may be received by ISVD application 122 after selection from a user interface window or after entry by a user into a user interface window. In an alternative embodiment, input dataset 124 may not be selectable. For example, a most recently created dataset may be used automatically or input dataset 124 may refer to streaming data as discussed in an alternative embodiment below. The first indicator may further indicate a plurality of variables of input dataset 124 to define $x_i$, where $N_v$ is a number of the plurality of variables of input dataset 124 used to define $x_i$. $N_v$ may indicate a number of rows of the left matrix V of the SVD. The first indicator may indicate that all or only a subset of the variables stored in input dataset 124 be used to compute the SVD matrices. For example, the first indicator indicates a list of variables to use by name, column number, etc. As another example, all of the variables may be used automatically.

In an operation 202, a second indicator is received that indicates a number of initialization observations $N_I$ to use for initialization. In an alternative embodiment, the second indicator may not be received. For example, the number of initialization observations $N_I$ may be stored, for example, in computer-readable medium 108 and used automatically. For illustration, the number of initialization observations $N_I$ may be 1000 though other values may be used.

In an operation 204, a third indicator is received that indicates a matrix row size value m that defines a number of rows of the left matrix U of the SVD. In an alternative embodiment, the third indicator may not be received. For example, the matrix row size value m may be stored, for example, in computer-readable medium 108 and used automatically. As another option, the matrix row size value m may be assumed to be equal to the number of initialization observations. For illustration, the matrix row size value m may be 1000 though other values may be used.

In an operation 206, a fourth indicator is received that indicates a rank value r that defines a number of columns and rows of the diagonal matrix Σ of the SVD. In an alternative embodiment, the fourth indicator may not be received. For example, the rank value r may be stored, for example, in computer-readable medium 108 and used automatically. As another option, the rank value r may be assumed to be equal to a number of the plurality of variables of input dataset 124 used to define $x_i$. For illustration, the rank value r may be the number of the plurality of variables of input dataset 124 used to define $x_i$ though other values may be used.

In an operation 208, a fifth indicator is received that indicates a number of threads $N_t$ to use to perform parallel computations. In an alternative embodiment, the fifth indicator may not be received. For example, the number of threads $N_t$ may be stored, for example, in computer-readable medium 108 and used automatically. As another option, the number of threads $N_t$ may be assumed to be equal to a number of processors of data decomposition device 100. For illustration, the number of threads $N_t$ may be one though other values may be used.

In an operation 210, a batch SVD method is applied to a first matrix A with initialization observations to compute the SVD of the first matrix A as $A=U\Sigma V^T$. The initialization observations include the number of initialization observations selected first from input dataset 124. The batch SVD method defines the left matrix U, the right matrix V, and the diagonal matrix $\Sigma$ from the matrix A defined with the initialization observations that has dimension $N_I \times N_v$. The diagonal matrix $\Sigma$ has the dimension of $N_v \times N_v$ for a full rank defined using all of the plurality of variables. The left matrix U has the dimension of $N_I \times N_v$, and the right matrix V has the dimension of $N_v \times N_v$.

In an operation 212, a dimension of the left matrix U, the right matrix V, and the diagonal matrix $\Sigma$ is reduced to have the rank value r and the matrix row size value m when the rank value $r \neq N_v$ and the matrix row size value $m \neq N_I$. The diagonal matrix $\Sigma$ has the dimension of $r \times r$. The left matrix U has the dimension of $m \times N_v$, and the right matrix V has the dimension of $N_v \times r$.

In an operation 214, a number of rank computations performed by each thread is determined for rank r and for rank r+1. For example, $N_{rc}=r/N_t$, $N_{rc+}=(r+1)/N_t$.

In an operation 216, a start rank index $i_{sr,t}$ and an end rank index $i_{er,t}$ is determined for each thread t for rank r. For illustration, the pseudocode below determines the start rank index $i_{sr,t}$ and the end rank index $i_{er,t}$ for each thread t.

$i=1$ for $t=1$ to $N_t$ do $i_{sr,t}=i$ if $t \leq \mathrm{mod}(r,N_t)$ then $i_{er,t}=i_{sr,t}+N_{rc}+1$ else $i_{er,t}=i_{sr,t}+N_{rc}$ end if $i=i_{er,t}+1$ end for A start rank index $i_{sr+,t}$ and an end rank index $i_{er+,t}$ is determined for each thread t for rank r+1. For illustration, the pseudocode below determines the start rank index $i_{sr+,t}$ and the end rank index $i_{er+,t}$ for each thread t and starts each thread t.

$i=1$ for $t=1$ to $N_t$ do $i_{sr+,t}=i$ if $t \leq \mathrm{mod}(r+1,N_t)$ then $i_{er+,t}=i_{sr+,t}+N_{rc+}+1$ else $i_{er+,t}=i_{sr+,t}+N_{rc+}$ end if $i=i_{er+,t}+1$ start thread t assigning $i_{sr,t}$ and $i_{er,t}$ and $i_{sr+,t}$ and $i_{er+,t}$ end for In an operation 218, a next observation vector d is read from input dataset 124. For example, on a first iteration of operation 218, a next observation vector after the initialization observations is read from input dataset 124; on a second iteration, a next observation vector after the observation vector read on the first iteration is read from input dataset 124; etc. In an illustrative embodiment, the input dataset 124 may be a matrix defined as part of a feature engineering process or as part of training a machine learning model using the plurality of observation vectors. Illustrative matrices for which a singular value decomposition is performed are described in U.S. Pat. No. 9,697,177, in U.S. Pat. No. 10,157,319, in U.S. Pat. No. 10,303,954, in U.S. Pat. No. 10,565,528, in U.S. Pat. No. 10,956,825, in U.S. Pat. No. 10,984,075, and in U.S. Pat. No. 11,010,691.

In an operation 220, the left matrix U, the right matrix V, and the diagonal matrix $\Sigma$ are updated by adding a row to the first matrix A defined by the read next observation vector. For example, referring to FIG. 3, example operations to add a row are described.

In an operation 300, an x vector is computed, for example, using $x=V^T d$, where T indicates a matrix transpose, x has dimension r, and V has dimension $N_v \times r$, and d has dimension $N_v \times 1$.

In an operation 302, a z vector is computed, for example, using $z=d-Vx$.

In an operation 304, a $\rho$ value is computed, for example, using $\rho=\|z\|_2$, where $\| \|_2$ indicates a Euclidean norm computation.

In an operation 306, a p vector is computed, for example, using $p=z/\rho$, where p has dimension $N_v$.

Operations 308 through 320 are performed in parallel by each respective thread t and perform operations to compute an SVD of a triangular arrowhead matrix. Operations 310 through 318 are further described in section 6.2 of a paper titled *Accurate eigenvalue decomposition of real symmetric arrowhead matrices and applications* by Stor et al. and published by Elsevier Inc. in Linear Algebra and its Applications, volume 464, on pages 62-89 in 2015 (Stor1).

In an operation 308, a rank index i is initialized using $i=i_{sr,t}$ by the associated thread t.

In an operation 310, an $i^{th}$ eigenpair is computed using an arrowhead matrix structure for rank index i. For example, referring to FIG. 4, example operations to compute eigenpairs using an arrowhead matrix structure are described.

Operations 400 through 422 are further described for an algorithm aheig_basic(D, z, a, k) described in the Stor1 paper, where $D=\Sigma^2$, $z=-v=\Sigma x$, $a=\rho+x^T x$, and $k=i$. The algorithm aheig_basic described in the Stor1 paper calculates an $i^{th}$ eigenpair of an irreducible arrowhead matrix $Q=[D, v; v^T, a]$.

In an operation 400, an n value is defined, for example, using n=length(v)+1.

In an operation 402, a determination is made concerning whether i=1. When i=1, processing continues in an operation 404. When i≠1, processing continues in an operation 406.

In operation 404, parameters are initialized based on i=1, and processing continues in operation 412. For example, $\sigma=D(1,1)$, k=1, and side='R', where indicates $\sigma$ a shift, k indicates a shift index, side indicates whether the eigenvalue is on a left or a right side of a nearest pole, and $D=\Sigma^2$.

In operation 406, a determination is made concerning whether i=n. When i=n, processing continues in an operation 408. When i≠n, processing continues in an operation 410.

In operation 408, parameters are initialized based on i=n, and processing continues in operation 412. For example, $\sigma=D(n-1, n-1)$, k=n-1, and side='L'.

In operation 410, parameters are initialized based on i≠1 and i≠n. For example, the following pseudocode describes initialization of the parameters $\sigma$, k, and side based on a midpoint value $F_{mid}$.

$$F_{mid} = \alpha - D(i, i) - D(i-1, i-1)/2 - \sum (v \odot v) \cdot / \left( \text{diag}(D) - D(i, i) - \left( \frac{D(i-1, i-1)}{2} \right) \right)$$

if $F_{mid}<0$ then $\sigma=D(i,i)$ $k=i$ side='R' else $\sigma=D(i-1,i-1)$ $k=i-1$ side='L' end if where diag(D) returns a column vector with the diagonal elements of D, ⊙ indicates a dot product, and ·/ indicates an elementwise division.

In operation 412, an inverse of an arrowhead matrix is computed using a method invA, for example, as described in the Stor1 paper. For example, $[D_1, D_2, w_1, w_2, w_\xi, b]=\text{invA}(D, v, a, i)$, where $D_1$ and $D_2$ are matrices, $w_1$, $w_2$, and $w_\xi$ are vectors, and b is a scalar value.

In an operation 414, a leftmost or a rightmost shifted eigenvalue eig of the inverse of the arrowhead matrix is computed using a bisection method bisect, for example, as described in the Stor1 paper. For example, $\text{eig}=\text{bisect}([D_1; 0; D_2], [w_1, w_\xi, w_2], b, \text{side})$.

In an operation 416, an $i^{th}$ eigenvector $v_i$ is computed, for example, using an algorithm vect, for example, as described in the Stor1 paper, where $v_i$ has dimension n. $v_i=\text{vect}(\text{diag}(D)-\sigma, v, 1/\text{eig})$.

In an operation 418, the $i^{th}$ eigenvalue is computed, for example, using $\lambda_i=1/\text{eig}+\sigma$.

In an operation 420, computation of the $i^{th}$ eigenpair that includes the eigenvalue $\lambda_i$ and the eigenvector $v_i$ is done.

Referring again to FIG. 3, in an operation 312, a right matrix H is updated for rank index i, for example, using $H(j, i)=v_i(j)$, $j=1, \ldots, n$.

In an operation 314, a left matrix G is updated for rank index i, for example, using $G(j, i)=\sqrt{\lambda_i}v_i(j)\cdot/\text{diag}(\Sigma)$, $j=1, \ldots, n-1$ and $G(n, i)=\rho v_i(n)/\sqrt{\lambda_i}$.

In an operation 315, the updated left matrix G is scaled, for example, using $$G(j, i) = \frac{G(j, i)}{\|G(j, i)\|_2},$$

$j=1, \ldots, n$.

In an operation 316, the $i^{th}$ diagonal matrix entry $\Sigma$ is updated for rank index i, for example, using $\Sigma(i, i)=\sqrt{\lambda_i}$.

In an operation 318, the rank index is incremented by each respective thread using $i=i+1$.

In an operation 320, a determination is made concerning whether there is another rank value to process by the respective thread based on the thread t's value for $i_{er,t}$. When $i \leq i_{er,t}$, processing continues in operation 310 to update the decomposition matrices for rank index i. When $i > i_{er,t}$, processing continues in an operation 322.

In an operation 322, the left matrix U is updated, for example, using U=UH(1:r, 1:r) and U(r+1, k)=H(r+1,1:r), where, prior to the update, U has dimension m×r, after the update, U has dimension (m+1)×r, and H has dimension (r+1)×r.

In an operation 324, the right matrix V is updated, for example, using V=VG(1:r, 1:r)+ρG(r+1,1:r), where, prior to the update, V has dimension $N_v$×r, after the update, V has dimension $(N_v+1)$×r, and G has dimension (r+1)×r.

In an operation 326, updating the left matrix U, the right matrix V, and the diagonal matrix $\Sigma$ based on the added row is done.

Referring again to FIG. 2, in an operation 222, the left matrix U updated in operation 322, the right matrix V updated in operation 324, and the diagonal matrix $\Sigma$ updated in operation 316 are updated again by removing a current first row from the first matrix A. For example, referring to FIG. 5, example operations to remove the current first row are described.

In an operation 500, a y matrix is defined, for example, using $y=U(1, j)^T$, $j=1, \ldots, r$, where y has dimension n×r.

In an operation 502, a z vector is computed, for example, using $z=e_1-Uy$, where $e_1$ is an (n+1)-dimensional vector with a one in the first entry and zeroes everywhere else.

In an operation 504, a $\rho$ value is computed, for example, using $\rho=\|z\|_2$.

In an operation 506, a q vector is computed, for example, using $q=z/\rho$, where q is an (n+1)-dimensional vector.

In an operation 508, an a vector is computed, for example, using $a=[-\Sigma \cdot^* y; 0]$, where ·* indicates elementwise multiplication, and a is an (n+1)-dimensional vector.

In an operation 510, a b vector is computed, for example, using $b=[y; \rho]$, b is an (n+1)-dimensional vector.

In an operation 512, a one-side low-rank SVD for a DPR1 matrix is computed. For example, referring to FIG. 6, example operations to compute the one-side low-rank SVD for a DPR1 matrix are described.

In an operation 600, an $n^+$ value is defined, for example, using $n^+=\text{length}(a)$.

In an operation 602, a $\tilde{b}$ vector is computed, for example, using $\tilde{b}=Db$, where $D=[\Sigma; 0]$.

In an operation 604, a $\beta$ value is computed, for example, using a $\beta=b^T b$.

In an operation 606, an H matrix is defined, for example, using $H=[\beta, 1; 1, 0]$.

In an operation 608, a Schur decomposition of the H matrix is computed to define a Q matrix and a T matrix.

In an operation 610, a $\rho_1$ value and a $\rho_2$ value are computed, for example, using $\rho_1=T(1,1)$ and $\rho_2=T(2,2)$.

In an operation 612, a $\bar{a}$ vector and a $\bar{b}$ vector are computed, for example, using $\bar{a}=aQ$ and $\bar{b}=\tilde{b}Q$.

In an operation 614, first eigenpair matrices $S_1$ and $U_1$ are computed based on a DPR1 matrix structure. For example, referring to FIG. 7, example operations to compute the eigenpairs of the DPR1 matrix are described.

In an operation 700, an $n_1$ value is defined, for example, using $n_1=\text{length}(\bar{a})$.

In an operation 702, a sign value is defined, for example, using sign=−1 if $\rho_1<0$; otherwise, sign=1 to support both positive and negative values of $\rho_1$.

In an operation 704, a rank index i is initialized using $i=i_{sr+,t}$ by the associated thread t.

In an operation 706, a determination is made concerning whether i=1 and sign=1. When i=1 and sign=1, processing continues in an operation 708. When i≠1 sign≠1, processing continues in an operation 710.

In operation 708, parameters are initialized based on i=1 and sign=1, and processing continues in an operation 716. For example, $\sigma=D^2(1,1)$, k=1, and side='R', where a is a shift parameter value, k is a shift index, and side is a pole direction value that indicates whether the eigenvalue is on a left side or a right side of a nearest pole.

In operation 710, a determination is made concerning whether $i=n_1$ and sign=−1. When $i=n_1$ and sign=−1, processing continues in an operation 712. Otherwise, processing continues in an operation 714.

In operation 712, parameters are initialized based on $i=n_1$ and sign=−1, and processing continues in operation 716. For example, $\sigma=D^2(n_1, n_1)$, $k=n_1$, and side='L'.

In operation 714, parameters are initialized. For example, the following pseudocode describes initialization of the parameters σ, k, and side based on a midpoint value $F_{mid}$.

$F_{mid}=1+\rho_1\Sigma((\bar{a}\odot\bar{a})\cdot/(\text{diag}(D^2)-D^2(i,i)-(D^2(i-\text{sign},i-\text{sign})/2)))$ if $F_{mid}>0$ then $\sigma=D^2(i,i)$ k=i if sign=1,side='R' if sign=−1,side='L' else $\sigma=D^2(i-\text{sign},i-\text{sign})$ k=i−sign if sign=1,side='L' if sign=−1,side='R' end if

In operation 716, an inverse of an arrowhead matrix is computed using the method invA. For example, $[D_1, D_2, w_1, w_2, w_{\bar{g}}, b]=\text{invA}(D^2, \bar{a}, \rho_1, k)$, where $D_1$ and $D_2$ are matrices, $w_1$, $w_2$, and $w_{\bar{g}}$ are vectors, and b is a scalar value.

In an operation 718, a leftmost or a rightmost shifted eigenvalue eig of the inverse of the arrowhead matrix is computed using the bisection method bisect. For example, $\text{eig}=\text{bisect}([D_1; 0; D_2], [w_1, w_{\bar{g}}, w_2], b, \text{side})$.

In an operation 720, an $i^{th}$ eigenvector is computed and stored in an $i^{th}$ column of a matrix $U_1$, for example, using the algorithm vect, $U_{1,i}=\text{vect}(\text{diag}(D^2)-\sigma, \bar{a}, 1/\text{eig})$.

In an operation 722, the $i^{th}$ eigenvalue is computed and stored in an $i^{th}$ column of a diagonal matrix $S_1$, for example, using $S_1(i, i)=1/\text{eig}+\sigma$.

In an operation 724, the rank index is incremented by each respective thread using i=i+1.

In an operation 726, a determination is made concerning whether there is another rank value to process by the respective thread based on the thread t's value for $i_{er+,t}$. When $i\le i_{er+,t}$, processing continues in operation 706 to update the decomposition matrices for rank index i. When $i>i_{er+,t}$, processing continues in an operation 728.

In operation 728, computation of the eigenpairs is done to define the diagonal matrix $S_1$ and the matrix $U_1$.

Referring again to FIG. 6, in an operation 616, a $\hat{b}$ vector is computed, for example, using $\hat{b}=U_1^T\bar{b}$.

In an operation 618, second eigenpair matrices $S_2$ and $U_2$ are computed based on the DPR1 matrix structure. For example, referring to FIG. 7, example operations to compute the eigenpairs of the DPR1 matrix are described.

In an operation 700, an $n_1$ value is defined, for example, using $n_1=\text{length}(\hat{b})$.

In an operation 702, a sign value is defined, for example, using sign=−1 if $\rho_2<0$; otherwise, sign=1.

In an operation 704, a rank index i is initialized using $i=i_{sr,t}$ by the associated thread t.

In an operation 706, a determination is made concerning whether i=1 and sign=1. When i=1 and sign=1, processing continues in an operation 708. When i≠1 sign≠1, processing continues in an operation 710.

In operation 708, parameters are initialized based on i=1 and sign=1, and processing continues in an operation 716. For example, $\sigma=S_1(1,1)$, k=1, and side='R', where indicates σ a shift, k indicates a shift index, and side indicates whether the eigenvalue is on a left or a right side of a nearest pole.

In operation 710, a determination is made concerning whether $i=n_1$ and sign=−1. When $i=n_1$ and sign=−1, processing continues in an operation 712. Otherwise, processing continues in an operation 714.

In operation 712, parameters are initialized based on $i=n_1$ and sign=−1, and processing continues in operation 716. For example, $\sigma=S_1(n_1, n_1)$, $k=n_1$, and side='L'.

In operation 714, parameters are initialized. For example, the following pseudocode describes initialization of the parameters σ, k, and side based on a midpoint value $F_{mid}$.

$F_{mid}=1+\rho_2\Sigma((\hat{b}\odot\hat{b})\cdot/(\text{diag}(S_1)-S_1(i,i)-(S_1(i-\text{sign},i-\text{sign})/2)))$ if $F_{mid}>0$ then $\sigma=S_1(i,i)$ k=i if sign=1,side='R' if sign=−1,side='L' else $\sigma = S_1(i\text{-sign}, i\text{-sign})$ $k = i\text{-sign}$ if sign=1,side='L' if sign=−1,side='R' end if

In operation 716, an inverse of an arrowhead matrix is computed using the method invA. For example, $[D_1, D_2, w_1, w_2, w_{\xi}, b] = \text{invA}(S_1, \bar{b}, \rho_2, k)$, where and $D_2$ are matrices, $w_1, w_2,$ and $w_{\xi}$ are vectors, and b is a scalar value.

In an operation 718, a leftmost or a rightmost shifted eigenvalue eig of the inverse of the arrowhead matrix is computed using the bisection method bisect. For example, $\text{eig} = \text{bisect}([D_1; 0; D_2], [w_1, w_{\xi}, w_2], b, \text{side})$.

In an operation 720, an $i^{th}$ eigenvector is computed and stored in an $i^{th}$ column of a matrix $U_2$, for example, using the algorithm vect, $U_{2,i} = \text{vect}(\text{diag}(S_1) - \sigma, \bar{a}, 1/\text{eig})$.

In an operation 722, the $i^{th}$ eigenvalue is computed and stored in an $i^{th}$ column of a diagonal matrix $S_2$, for example, using $S_2(i, i) = 1/\text{eig} + \sigma$.

In an operation 724, the rank index is incremented by each respective thread using $i = i+1$.

In an operation 726, a determination is made concerning whether there is another rank value to process by the respective thread based on the thread t's value for $i_{er,t}$. When $i \le i_{er,t}$, processing continues in operation 706 to update the decomposition matrices for rank index i. When $i > i_{er,t}$, processing continues in an operation 728.

In operation 728, computation of the eigenpairs is done to define the diagonal matrix $S_2$ and the matrix $U_2$.

Referring again to FIG. 6, in an operation 620, a G matrix is defined, for example, using $G = U_1 U_2$.

In an operation 622, the $\Sigma$ matrix is computed, for example, using $\Sigma = S_2^{0.5}$.

In an operation 624, the computation of the one-side low-rank SVD for the DPR1 matrix is done.

Referring again to FIG. 5, in an operation 514, a K matrix is computed, for example, using $$K = \begin{bmatrix} \Sigma & 0 \\ 0 & 0 \end{bmatrix} + \begin{bmatrix} y \\ \rho \end{bmatrix} [-y^T \Sigma \quad 0].$$

In an operation 516, an H matrix is computed, for example, using $H = (K^T G) \cdot / \Sigma$.

In an operation 518, the left matrix U is updated, for example, using $U = U(2:,:)H(1:r, 1:r) + q(2:,:)H(r+1,1:r)$, where, prior to the update, U has dimension $(m+1) \times r$, after the update, U has dimension $m \times r$, H has dimension $(r+1) \times r$, and q has dimension $(m+1) \times 1$.

In an operation 520, the right matrix V is updated, for example, using $V = VG(1:r, 1:r)$, where V has dimension $N_v \times r$, and G has dimension $(r+1) \times r$.

In an operation 522, updating the left matrix U, the right matrix V, and the diagonal matrix $\Sigma$ based on removing the first row is done.

Referring again to FIG. 2, in an operation 224, the left matrix U, the right matrix V, and the diagonal matrix $\Sigma$ updated in operation 222 are output. For example, the left matrix U, the right matrix V, and the diagonal matrix $\Sigma$ updated in operation 222 may be output by writing them to decomposed matrices dataset 126.

Alternatively, or in addition, the left matrix U, the right matrix V, and the diagonal matrix $\Sigma$ updated in operation 222 may be output by providing them to an executing process that requested the SVD computation. For example, the executing process may provide the indicators in operations 200 through 208 and request initialization of the SVD process that triggers execution of operations 210 through 216 and returns the left matrix U, the right matrix V, and the diagonal matrix $\Sigma$ computed in operations 210 and 212. Subsequently, the executing process may provide the next observation or may indicate that a next observation be read from input dataset 124 that triggers execution of operations 220 and 222 and returns the left matrix U, the right matrix V, and the diagonal matrix $\Sigma$ updated in operation 222. For example, the executing process may be training a machine learning model or performing a feature engineering process and call a function to compute the left matrix U, the right matrix V, and the diagonal matrix $\Sigma$ incrementally updated with the next observation. For illustration, the function may be configured to receive the left matrix U, the right matrix V, the diagonal matrix $\Sigma$, and the next observation as inputs and to output the left matrix U, the right matrix V, and the diagonal matrix $\Sigma$ updated in operation 222. Thus, the called function may perform operations 220, 222, and 224 based on a call from the executing process.

In an operation 226, a determination is made concerning whether there is an additional observation vector in input dataset 124 to process. When there is an additional observation vector, processing continues in operation 218 to update the decomposition matrices. When there is not an additional observation vector, processing continues in an operation 228. In an illustrative embodiment, the executing process may perform operations 218 and 226 calling the function with the next observation.

In operation 228, processing of the observation vectors included in input dataset 124 is done.

Figure 8:
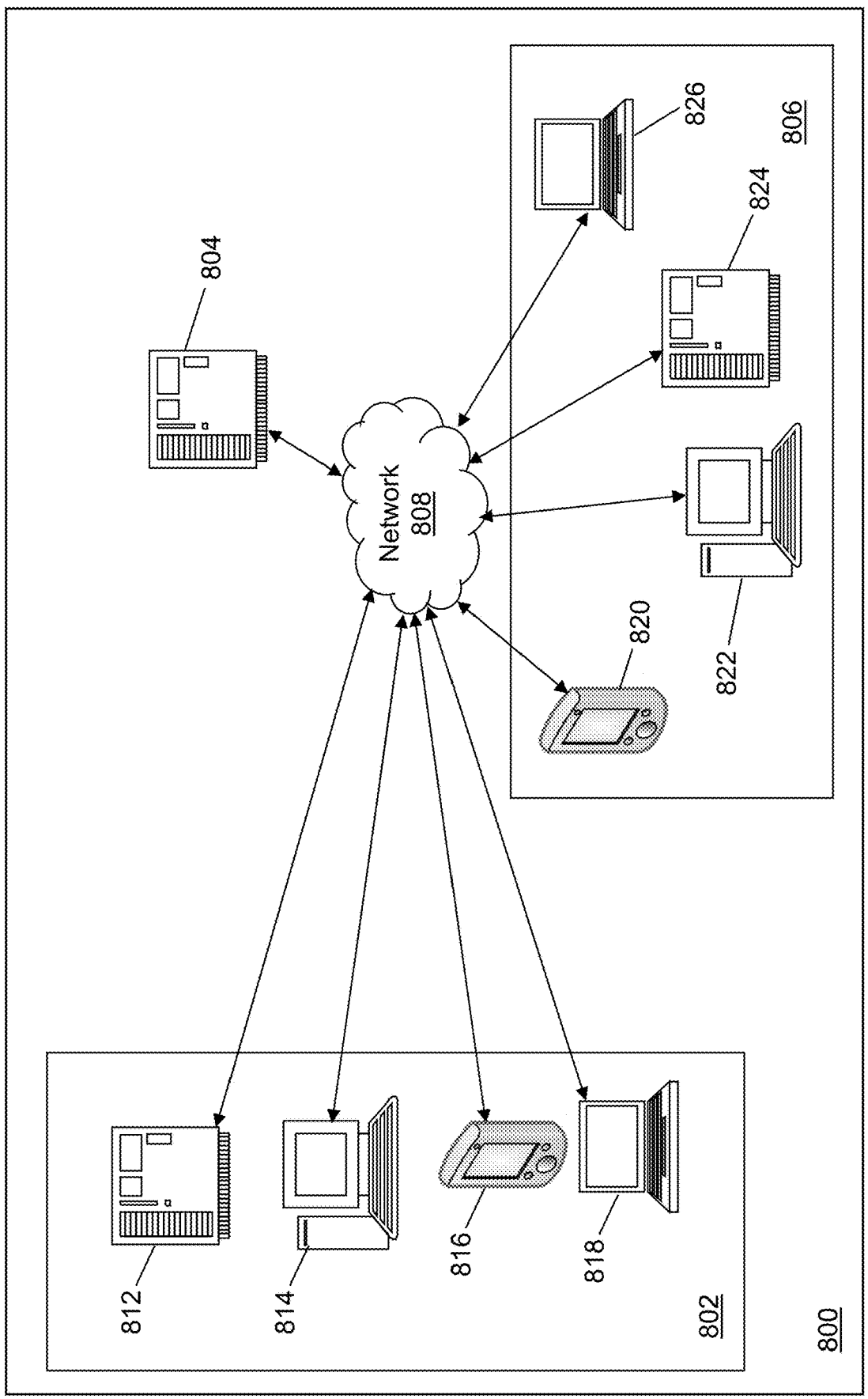
FIG. 8 depicts a block diagram of an event stream processing (ESP) system in accordance with an illustrative embodiment.

Referring to FIG. 8, a block diagram of a stream processing system 800 is shown in accordance with an illustrative embodiment. In an illustrative embodiment, stream processing system 800 may include an event publishing system 802, an ESP device 804, an event subscribing system 806, and a network 808. Each of event publishing system 802, ESP device 804, and event subscribing system 806 may be composed of one or more discrete devices in communication through network 808.

Event publishing system 802 publishes a measurement data value to ESP device 804 as an "event". An event is a data record that reflects a state of a system or a device. An event object is stored using a predefined format that includes fields and keys. For illustration, a first field and a second field may represent an operation code (opcode) and a flag. The opcode enables update, upsert, insert, and delete of an event object. The flag indicates whether the measurement data value and/or other field data has all of the fields filled or only updated fields in the case of an "Update" opcode. An "Upsert" opcode updates the event object if a key field already exists; otherwise, the event object is inserted. ESP device 804 receives the measurement data value in an event stream, processes the measurement data value, and identifies a computing device of event subscribing system 806 to which the processed measurement data value is sent.

Network 808 may include one or more networks of the same or different types. Network 808 can be any type of wired and/or wireless public or private network including a cellular network, a local area network, a wide area network such as the Internet or the World Wide Web, etc. Network 808 further may comprise sub-networks and consist of any number of communication devices.

The one or more computing devices of event publishing system 802 may include computing devices of any form factor such as a server computer 812, a desktop 814, a smart phone 816, a laptop 818, a personal digital assistant, an integrated messaging device, a tablet computer, a point of sale system, a transaction system, an IoT device, etc. Event publishing system 802 can include any number and any combination of form factors of computing devices that may be organized into subnets. The computing devices of event publishing system 802 send and receive signals through network 808 to/from another of the one or more computing devices of event publishing system 802 and/or to/from ESP device 804. The one or more computing devices of event publishing system 802 may communicate using various transmission media that may be wired and/or wireless as understood by those skilled in the art. The one or more computing devices of event publishing system 802 may be geographically dispersed from each other and/or co-located. Each computing device of the one or more computing devices of event publishing system 802 may be executing one or more event publishing applications such as an event publishing application 1222 (shown referring to FIG. 12) of the same or different type.

ESP device 804 can include any form factor of computing device. For illustration, FIG. 8 represents ESP device 804 as a server computer. In general, a server computer may include faster processors, additional processors, more disk memory, and/or more RAM than a client computer and support multi-threading as understood by a person of skill in the art. ESP device 804 sends and receives signals through network 808 to/from event publishing system 802 and/or to/from event subscribing system 806. ESP device 804 may communicate using various transmission media that may be wired and/or wireless as understood by those skilled in the art. ESP device 804 may be implemented on a plurality of computing devices of the same or different type that may support failover processing.

The one or more computing devices of event subscribing system 806 may include computers of any form factor such as a smart phone 820, a desktop 822, a server computer 824, a laptop 826, a personal digital assistant, an integrated messaging device, a tablet computer, etc. Event subscribing system 806 can include any number and any combination of form factors of computing devices. The computing devices of event subscribing system 806 send and receive signals through network 808 to/from ESP device 804. The one or more computing devices of event subscribing system 806 may be geographically dispersed from each other and/or co-located. The one or more computing devices of event subscribing system 806 may communicate using various transmission media that may be wired and/or wireless as understood by those skilled in the art. Each computing device of the one or more computing devices of event subscribing system 806 may be executing one or more event subscribing applications such as an event subscribing application 1422 (shown referring to FIG. 14) of the same or different type.

Figure 9:
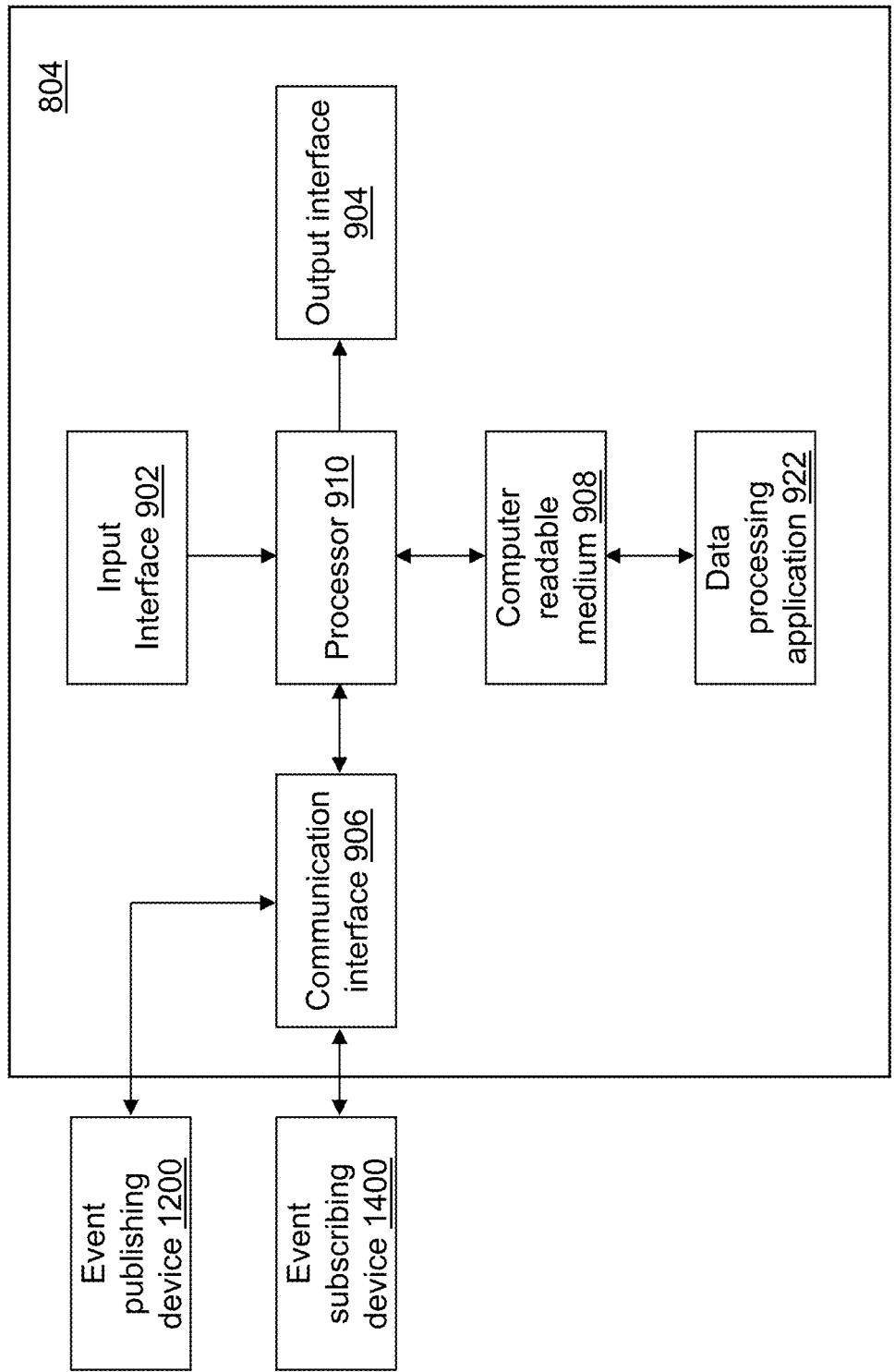
FIG. 9 depicts a block diagram of an ESP device of FIG. 8 in accordance with an illustrative embodiment.

Referring to FIG. 9, a block diagram of ESP device 804 is shown in accordance with an illustrative embodiment. ESP device 804 may include a second input interface 902, a second output interface 904, a second communication interface 906, a second non-transitory computer-readable medium 908, a second processor 910, and data processing application 922. Fewer, different, and/or additional components may be incorporated into ESP device 804. ESP device 804 and data decomposition device 100 may be the same or different devices.

Second input interface 902 provides the same or similar functionality as that described with reference to input interface 102 of data decomposition device 100 though referring to ESP device 804. Second output interface 904 provides the same or similar functionality as that described with reference to output interface 104 of data decomposition device 100 though referring to ESP device 804. Second communication interface 906 provides the same or similar functionality as that described with reference to communication interface 106 of data decomposition device 100 though referring to ESP device 804. Data and messages may be transferred between ESP device 804 and event publishing system 802 or event subscribing system 806 using second communication interface 906. Second computer-readable medium 908 provides the same or similar functionality as that described with reference to computer-readable medium 108 of data decomposition device 100 though referring to ESP device 804. Second processor 910 provides the same or similar functionality as that described with reference to processor 110 of data decomposition device 100 though referring to ESP device 804.

Figure 12:
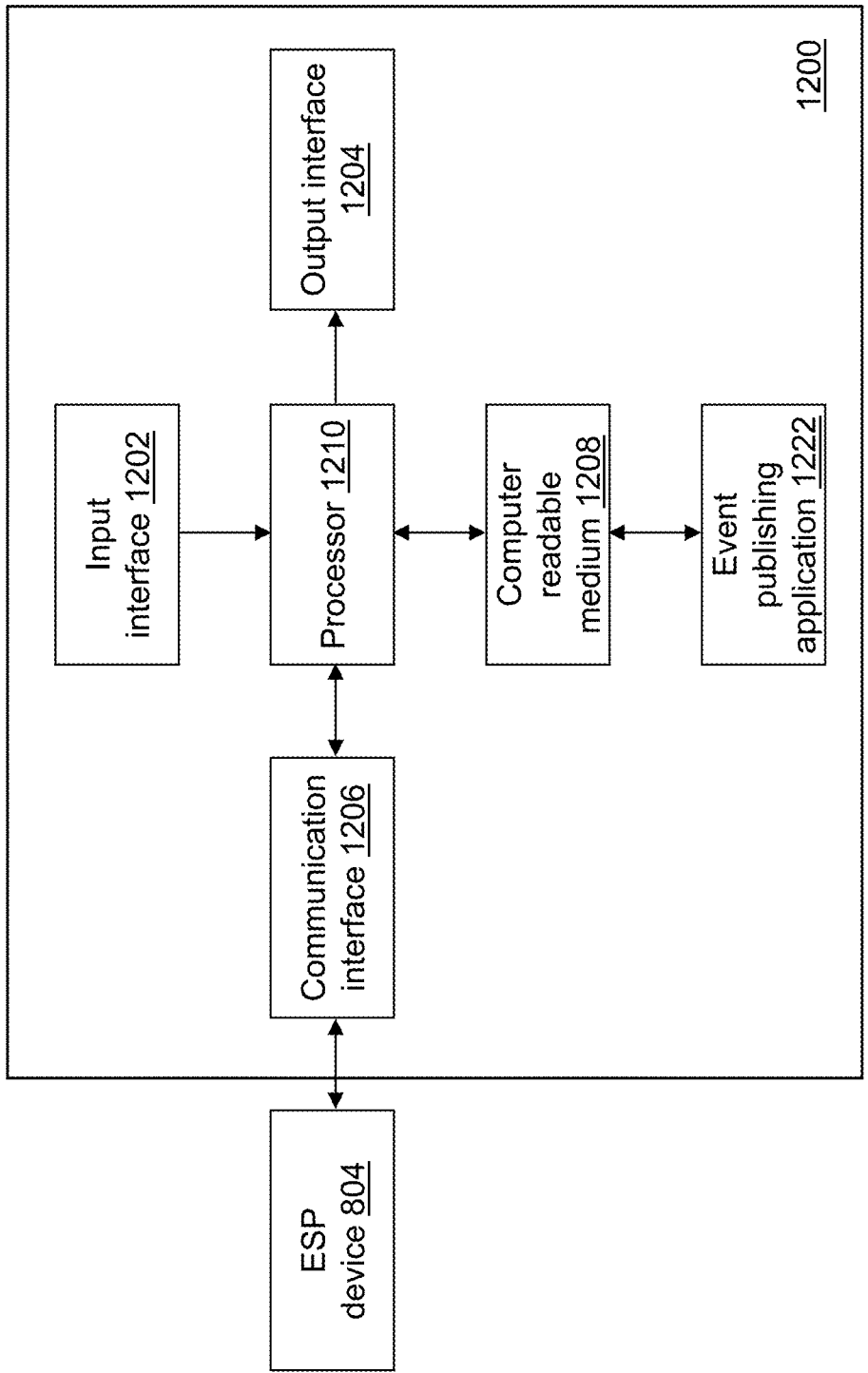
FIG. 12 depicts a block diagram of an event publishing device of an event publishing system of the ESP system of FIG. 8 in accordance with an illustrative embodiment.

Data processing application 922 performs operations similar to ISVD application 122 on new observation vectors received from an event publishing device 1200 (shown referring to FIG. 12). Data processing application 922 may execute all or a subset of the operations of ISVD application 122. Some or all of the operations described herein may be embodied in data processing application 922. The operations may be implemented using hardware, firmware, software, or any combination of these methods.

Referring to the example embodiment of FIG. 9, data processing application 922 is implemented in software (comprised of computer-readable and/or computer-executable instructions) stored in second computer-readable medium 908 and accessible by second processor 910 for execution of the instructions that embody the operations of data processing application 922. Data processing application 922 may be written using one or more programming languages, assembly languages, scripting languages, etc. Data processing application 922 may be integrated with other analytic tools. As an example, data processing application 922 may be part of an integrated data analytics software application and/or software architecture such as that offered by SAS Institute Inc. of Cary, N.C., USA. For example, data processing application 922 may be part of SAS® Enterprise Miner™ developed and provided by SAS Institute Inc. of Cary, N.C., USA that may be used to create highly accurate predictive and descriptive models based on analysis of vast amounts of data from across an enterprise. Merely for further illustration, data processing application 922 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, and SAS® Forecast Server, all of which are developed and provided by SAS Institute Inc. of Cary, N.C., USA. One or more operations of data processing application 922 further may be performed by an ESPE. Data processing application 922 may be implemented as a Web application.

Referring to FIGS. 10A to 10D, flow diagrams illustrating examples of operations performed by ESP device 804 are shown in accordance with an illustrative embodiment. Additional, fewer, or different operations may be performed depending on the embodiment of data processing application 922. The order of presentation of the operations of FIGS. 10A to 10D is not intended to be limiting. Although some of the operational flows are presented in sequence, the various operations may be performed in various repetitions, concurrently (in parallel, for example, using threads), and/or in other orders than those that are illustrated. In an illustrative embodiment, ESP device 804 is also configured to perform one or more of the operations of FIGS. 2 to 7.

Figure 10A:
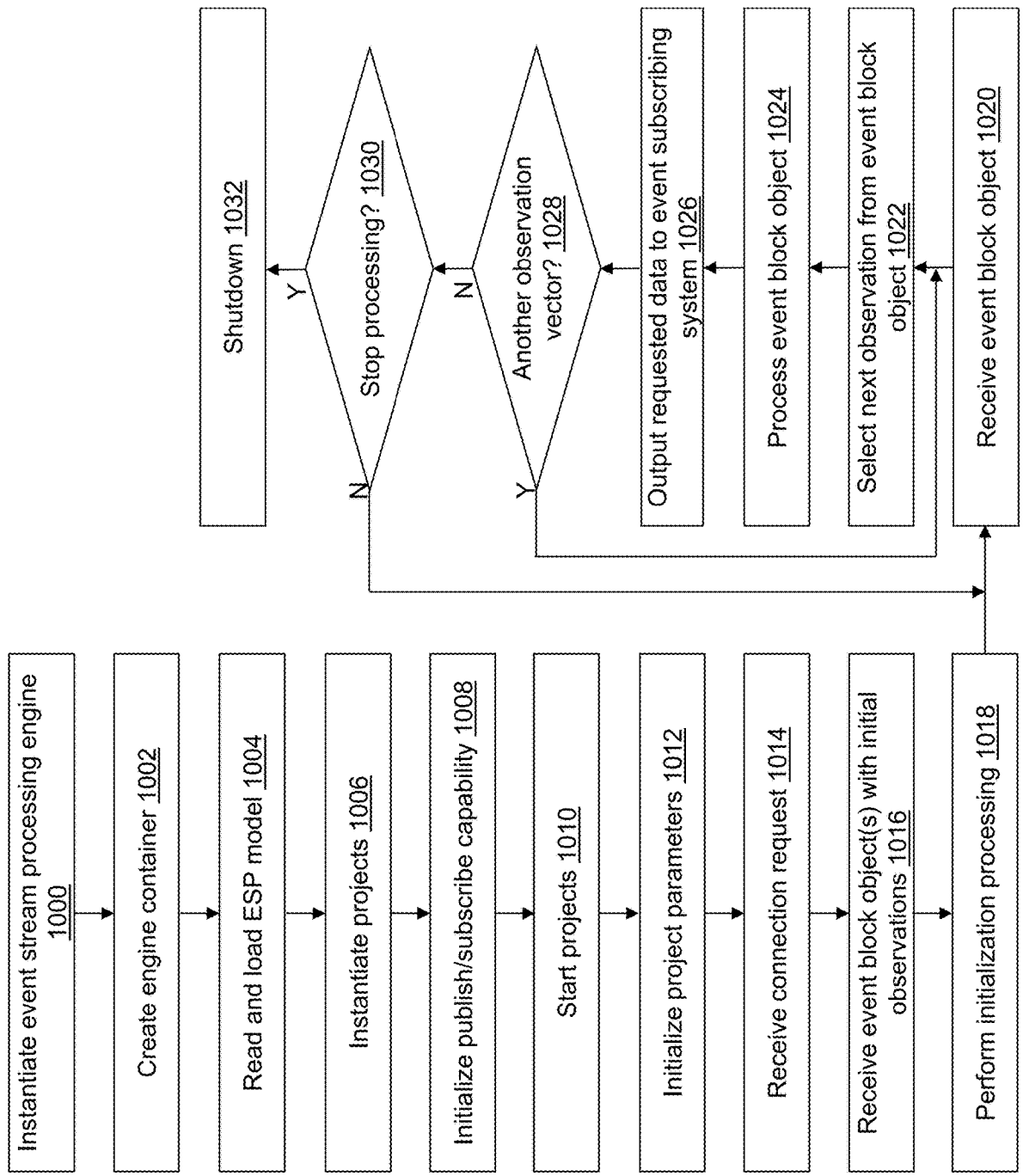
FIGS. 10A-10D depict flow diagrams illustrating examples of operations performed by the ESP device of FIG. 9 in accordance with an illustrative embodiment.
Figure 11:
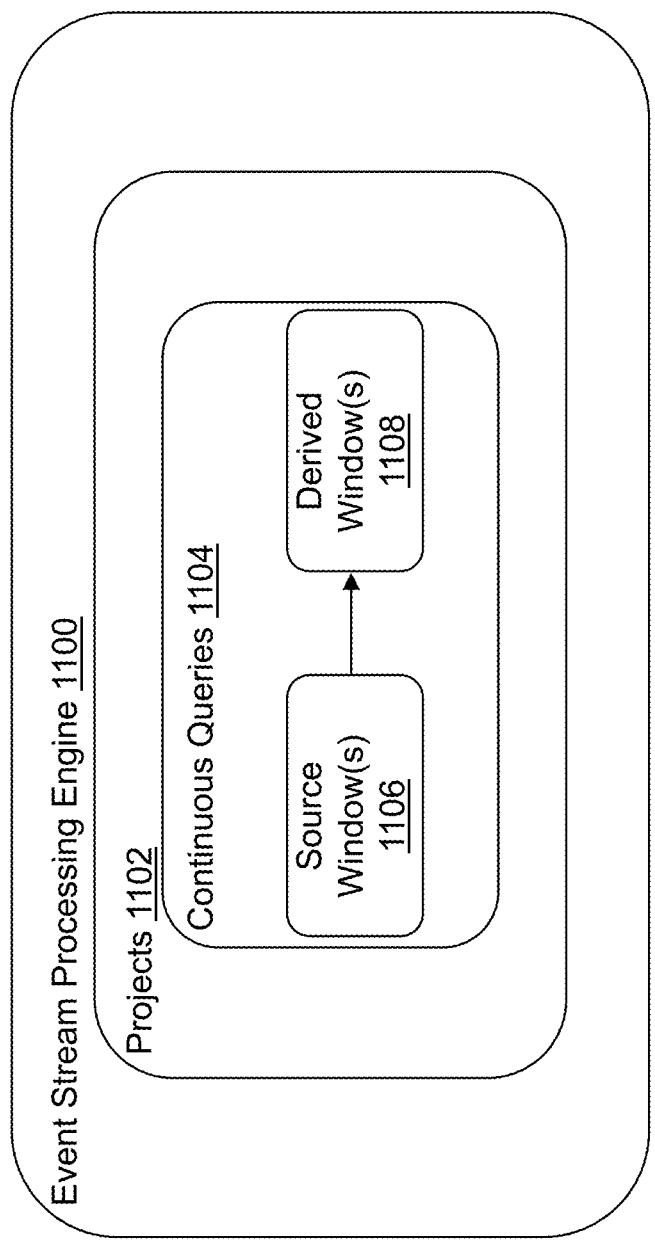
FIG. 11 depicts a block diagram of an ESP engine executing on the ESP device of FIG. 9 in accordance with an illustrative embodiment.

Referring to FIG. 10A, in an operation 1000, an ESP engine (ESPE) 1100 (shown referring to FIG. 11) is instantiated. For example, referring to FIG. 11, the components of ESPE 1100 executing at ESP device 804 are shown in accordance with an illustrative embodiment. ESPE 1100 may include one or more projects 1102. A project may be described as a second-level container in an engine model managed by ESPE 1100 where a thread pool size for the project may be defined by a user. A value of one for the thread pool size indicates that writes are single-threaded. Each project of the one or more projects 1102 may include one or more continuous queries 1104 that contain data flows, which are data transformations of incoming event streams. The one or more continuous queries 1104 may include one or more source windows 1106 and one or more derived windows 1108.

The engine container is the top-level container in a model that manages the resources of the one or more projects 1102. Each ESPE 1100 has a unique engine name. Additionally, the one or more projects 1102 may each have unique project names, and each query may have a unique continuous query name and begin with a uniquely named source window of the one or more source windows 1106. Each ESPE 1100 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 1106 and the one or more derived windows 1108 represent continuously executing queries that generate updates to a query result set as new event blocks stream through ESPE 1100. A directed graph, for example, is a set of nodes connected by edges, where the edges have a direction associated with them.

An event object may be described as a packet of data accessible as a collection of fields, with at least one of the fields defined as a key or unique identifier (ID). The event object may be an individual record of an event stream. The event object may be created using a variety of formats including binary, alphanumeric, XML, etc. Each event object may include one or more fields designated as a primary ID for the event so ESPE 1100 can support the opcodes for events including insert, update, upsert, and delete. As a result, events entering a source window of the one or more source windows 1106 may be indicated as insert (I), update (U), delete (D), or upsert (P).

For illustration, an event object may be a packed binary representation of one or more sensor measurements and may include both metadata and measurement data associated with a timestamp value. The metadata may include the opcode indicating if the event represents an insert, update, delete, or upsert, a set of flags indicating if the event is a normal, a partial-update, or a retention generated event from retention policy management, and one or more microsecond timestamps. For example, the one or more microsecond timestamps may indicate a sensor data generation time, a data receipt time by event publishing device 1200, a data transmit time by event publishing device 1200, a data receipt time by ESP device 804, etc.

An event block object may be described as a grouping or package of one or more event objects. An event stream may be described as a flow of event block objects. A continuous query of the one or more continuous queries 1104 transforms the incoming event stream made up of streaming event block objects published into ESPE 1100 into one or more outgoing event streams using the one or more source windows 1106 and the one or more derived windows 1108. A continuous query can also be thought of as data flow modeling. One or more of the operations of FIGS. 2 to 7 may be implemented by the continuous query of the one or more continuous queries 1104.

The one or more source windows 1106 are at the top of the directed graph and have no windows feeding into them. Event streams are published into the one or more source windows 1106 by event publishing system 806, and from there, the event streams are directed to the next set of connected windows as defined by the directed graph. The one or more derived windows 1108 are all instantiated windows that are not source windows and that have other windows streaming events into them. The one or more derived windows 1108 perform computations or transformations on the incoming event streams. The one or more derived windows 1108 transform event streams based on the window type (that is operators such as join, filter, compute, aggregate, copy, pattern match, procedural, union, etc.) and window settings. As event streams are published into ESPE 1100, they are continuously queried, and the resulting sets of derived windows in these queries are continuously updated.

Referring again to FIG. 10A, in an operation 1002, the engine container is created. For illustration, ESPE 1100 may be instantiated using a function call that specifies the engine container as a manager for the model. The function call may include the engine name for ESPE 1100 that may be unique to ESPE 1100.

In an operation 1004, an ESP model that may be stored locally to second computer-readable medium 908 is read and loaded.

In an operation 1006, the one or more projects 1102 defined by the ESP model are instantiated. Instantiating the one or more projects 1102 also instantiates the one or more continuous queries 1104, the one or more source windows 1106, and the one or more derived windows 1108 defined from the ESP model. Based on the ESP model, ESPE 1100 may analyze and process events in motion or event streams. Instead of storing events and running queries against the stored events, ESPE 1100 may store queries and stream events through them to allow continuous analysis of data as it is received. The one or more source windows 1106 and the one or more derived windows 1108 defined from the ESP model may be created based on the relational, pattern matching, and procedural algorithms that transform the input event streams into the output event streams to model, simulate, score, test, predict, etc. based on the continuous query model defined by the ESP model and event publishing application 1222 that is streaming data to ESPE 1100.

In an operation 1008, the pub/sub capability is initialized for ESPE 1100. In an illustrative embodiment, the pub/sub capability is initialized for each project of the one or more projects 1102. To initialize and enable pub/sub capability for ESPE 1100, a host name and a port number are provided. The host name and the port number of ESPE 1100 may be read from the ESP model. Pub/sub clients can use the host name and the port number of ESP device 804 to establish pub/sub connections to ESPE 1100. For example, a server listener socket is opened for the port number to enable event publishing system 802 and/or event subscribing system 806 to connect to ESPE 1100 for pub/sub services. The host name and the port number of ESP device 804 to establish pub/sub connections to ESPE 1100 may be referred to as the host:port designation of ESPE 1100 executing on ESP device 804.

Pub/sub is a message-oriented interaction paradigm based on indirect addressing. Processed data recipients (event subscribing system 806) specify their interest in receiving information from ESPE 1100 by subscribing to specific classes of events, while information sources (event publishing system 802) publish events to ESPE 1100 without directly addressing the data recipients.

In an operation 1010, the one or more projects 1102 defined from the ESP model are started. The one or more started projects may run in the background on ESP device 804.

In an operation 1012, project parameters may be initialized. For example, the one or more projects 1102 may be initialized by performing one or more of operations 202 through 208 where the indicators may be read from the ESP model in operation 1004.

In an operation 1014, a connection request is received from event publishing device 1200 for a source window to which data will be published. A connection request further is received from a computing device of event subscribing system 806, for example, from event subscribing device 1400 (shown referring to FIG. 14).

In an operation 1016, an event block object is received from event publishing device 1200 with the initial observations. An event block object containing one or more event objects is injected into a source window of the one or more source windows 1106 defined from the ESP model. The event block object may include one or more observation vectors. Each time a new event block object is received into the source window, the appropriate data within the received event block object is extracted for processing. Processing may not continue until all of the initial observations are received in event block objects. Alternatively, the initial observations may be read from a location indicated in the read ESP model.

In an operation 1018, initialization processing is performed for each project. For example, the one or more projects 1102 may be initialized by performing one or more of operations 210 through 216.

In an operation 1020, an event block object is received from event publishing device 1200.

In an operation 1022, a next observation vector is selected from the received event block object.

In an operation 1024, the selected event block object is processed through the one or more continuous queries 1104. For example, the one or more continuous queries 1104 may be designed to compute the decomposed matrices as defined by operations 220 and 222 of FIG. 2. The unique ID assigned to the event block object by event publishing device 1200 is maintained as the event block object is passed through ESPE 1100 and between the one or more source windows 1106 and/or the one or more derived windows 1108 of ESPE 1100. A unique embedded transaction ID further may be embedded in the event block object as the event block object is processed by a continuous query. ESPE 1100 maintains the event block containership aspect of the received event blocks from when the event block is published into a source window and works its way through the directed graph defined by the one or more continuous queries 1104 with the various event translations before being output to event subscribing device 1400.

The one or more continuous queries 1104 further may be designed to compute the decomposition matrices as part of training a machine learning model or performing principal component analysis.

Figure 10C:
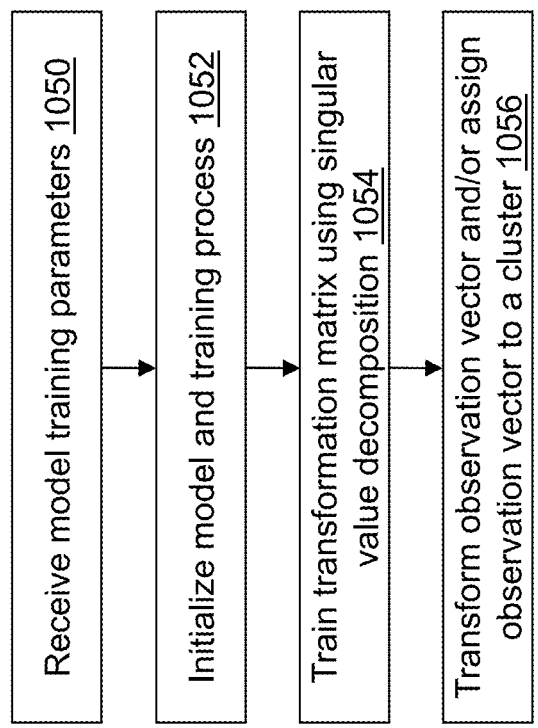
Figure 10B:
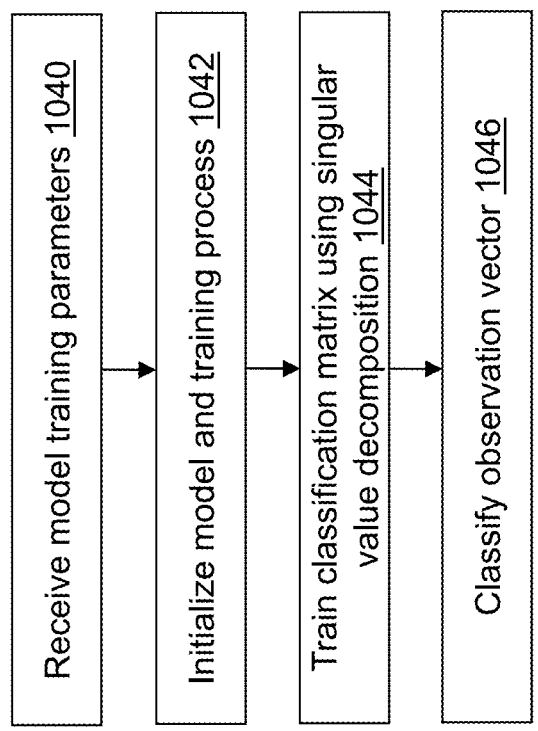

For example, referring to FIG. 10B, additional operations that may be performed by the one or more continuous queries 1104 are described.

In an operation 1040, model and model training parameters may be received for example as part of execution of operation 1012 where the model and model training parameters are read from the ESP model.

In an operation 1042, the model training process and the model may be initialized for example as part of execution of operation 1018.

In an operation 1044, a classification matrix is trained using a singular value decomposition computed using operations 220 and 222 of FIG. 2. For example, illustrative training operations are described in U.S. Pat. No. 10,956,825 and in U.S. Pat. No. 11,010,691.

In an operation 1046, the selected next observation vector is classified using the trained classification matrix.

As another example, referring to FIG. 10C, additional operations that may be performed by the one or more continuous queries 1104 are described.

In an operation 1050, model and model training parameters may be received for example as part of execution of operation 1012 where the model and model training parameters are read from the ESP model.

In an operation 1052, the model training process and the model may be initialized for example as part of execution of operation 1018.

In an operation 1054, a transformation matrix is trained using a singular value decomposition computed using operations 220 and 222 of FIG. 2. For example, illustrative training operations are described in U.S. Pat. No. 10,984,075.

In an operation 1056, the selected next observation vector is transformed using the trained transformation matrix and may be assigned to a cluster.

Figure 10D:
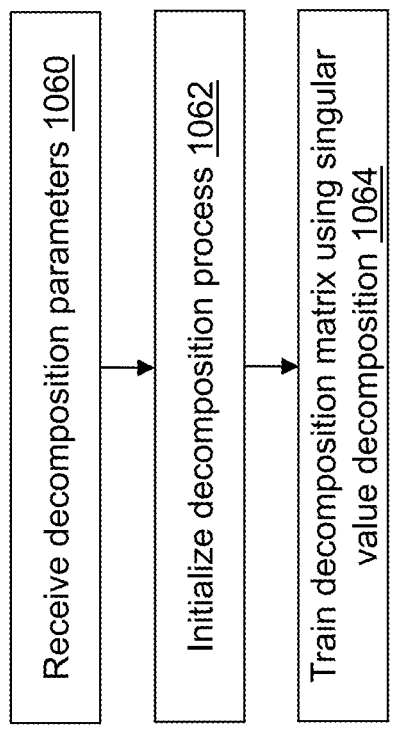

As yet another example, referring to FIG. 10D, additional operations that may be performed by the one or more continuous queries 1104 are described.

In an operation 1060, decomposition parameters may be received for example as part of execution of operation 1012 where the model and model training parameters are read from the ESP model.

In an operation 1062, the decomposition process may be initialized for example as part of execution of operation 1018.

In an operation 1064, a decomposition of an input matrix is trained using a singular value decomposition computed using operations 220 and 222 of FIG. 2. The trained decomposition of the input matrix may be part of a feature engineering process. Feature engineering plays an important role in the success of a machine learning model. Much of the effort in training a model goes into data preparation and choosing the right features to represent the data. Often, features in the original data are not optimal and feature engineering is used to learn a good representation as an input to machine learning models. For example, principal component analysis is a widely used tool to obtain a low-rank subspace from high dimensional data. The decomposition of the input matrix may be performed incrementally as observation vectors are received. For example, illustrative training operations are described in U.S. Pat. No. 9,697,177, in U.S. Pat. No. 10,157,319, in U.S. Pat. No. 10,303,954, and in U.S. Pat. No. 10,565,528.

Referring again to FIG. 10A, in an operation 1026, data computed from the processed event block object are output to one or more subscribing devices of event subscribing system 806 such as event subscribing device 1400. An output from the one or more continuous queries 1104 may be the decomposed matrices, classification data, cluster data, a transformed observation vector, a ranking of the variables as important features for use in training a machine learning model, etc.

Event subscribing device 1400 can correlate a group of subscribed event block objects back to a group of published event block objects by comparing the unique ID of the event block object that a publisher, such as event publishing device 1200, attached to the event block object with the event block ID received by event subscribing device 1400. The received event block objects further may be stored, for example, in a RAM or cache type memory of second computer-readable medium 908.

In an operation 1028, a determination is made concerning whether or not the event block object includes another observation vector. When the event block object includes another observation vector, processing continues in operation 1022. If the event block object does not include another observation vector, processing continues in an operation 1030.

In operation 1030, a determination is made concerning whether or not processing is stopped. If processing is not stopped, processing continues in operation 1020 to continue receiving the one or more event streams containing event block objects from event publishing device 1200. If processing is stopped, processing continues in an operation 1032.

In operation 1032, ESPE 1100 is shutdown.

Referring to FIG. 12, a block diagram of event publishing device 1200 of event publishing system 802 is shown in accordance with an example embodiment. Event publishing device 1200 is an example computing device of event publishing system 802. For example, each of server computer 812, desktop 814, smart phone 816, and laptop 818 may be an instance of event publishing device 1200. Event publishing device 1200 may include a third input interface 1202, a third output interface 1204, a third communication interface 1206, a third computer-readable medium 1208, a third processor 1210, and event publishing application 1222. Each event publishing device 1200 of event publishing system 802 may include the same or different components and combinations of components. Fewer, different, and additional components may be incorporated into event publishing device 1200.

Third input interface 1202 provides the same or similar functionality as that described with reference to input interface 102 of data decomposition device 100 though referring to event publishing device 1200. Third output interface 1204 provides the same or similar functionality as that described with reference to output interface 104 of data decomposition device 100 though referring to event publishing device 1200. Third communication interface 1206 provides the same or similar functionality as that described with reference to communication interface 106 of data decomposition device 100 though referring to event publishing device 1200. Data and messages may be transferred between event publishing device 1200 and ESP device 804 using third communication interface 1206. Third computer-readable medium 1208 provides the same or similar functionality as that described with reference to computer-readable medium 108 of data decomposition device 100 though referring to event publishing device 1200. Third processor 1210 provides the same or similar functionality as that described with reference to processor 110 of data decomposition device 100 though referring to event publishing device 1200.

Event publishing application 1222 performs operations associated with generating data included in the event block objects and publishing the event block objects in an event stream to ESP device 804. The operations may be implemented using hardware, firmware, software, or any combination of these methods. Referring to the example embodiment of FIG. 12, event publishing application 1222 is implemented in software (comprised of computer-readable and/or computer-executable instructions) stored in third computer-readable medium 1208 and accessible by third processor 1210 for execution of the instructions that embody the operations of event publishing application 1222. Event publishing application 1222 may be written using one or more programming languages, assembly languages, scripting languages, etc. Event publishing application 1222 may be implemented as a Web application.

Figure 13:
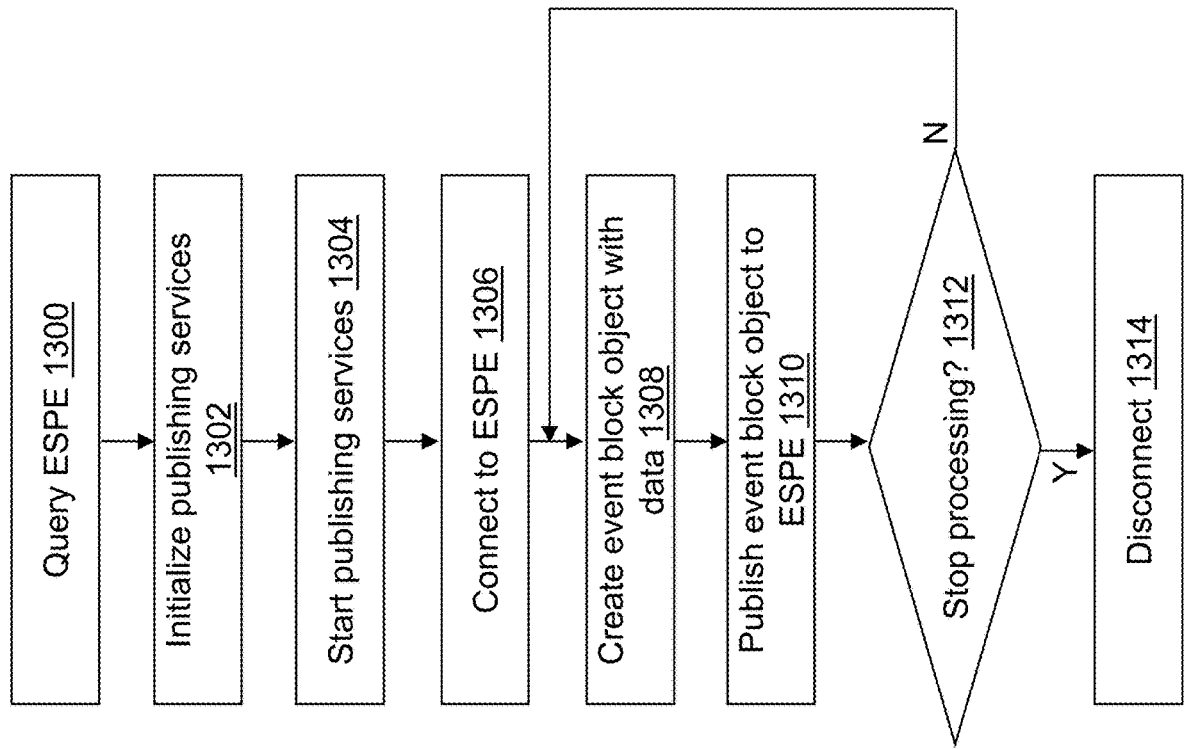
FIG. 13 depicts a flow diagram illustrating examples of operations performed by the event publishing device of FIG. 12 in accordance with an illustrative embodiment.

Referring to FIG. 13, example operations associated with event publishing application 1222 are described. Additional, fewer, or different operations may be performed depending on the embodiment. The order of presentation of the operations of FIG. 13 is not intended to be limiting. A user can interact with one or more user interface windows presented to the user in a display under control of event publishing application 1222 independently or through a browser application in an order selectable by the user. Although some of the operational flows are presented in sequence, the various operations may be performed in various repetitions, concurrently, and/or in other orders than those that are illustrated. For example, a user may execute event publishing application 1222, which causes presentation of a first user interface window, which may include a plurality of menus and selectors such as drop-down menus, buttons, text boxes, hyperlinks, etc. associated with event publishing application 1222 as understood by a person of skill in the art. As further understood by a person of skill in the art, various operations may be performed in parallel, for example, using a plurality of threads or a plurality of computing devices such as a grid or a cloud of computing devices.

In an operation 1300, ESPE 1100 is queried, for example, to discover projects 1102, continuous queries 1104, windows 1106, 1108, window schema, and window edges currently running in ESPE 1100. The engine name and host/port to ESPE 1100 may be provided as an input to the query and a list of strings may be returned with the names of the projects 1102, of the continuous queries 1104, of the windows 1106, 1108, of the window schema, and/or of the window edges of currently running projects on ESPE 1100. The host is associated with a host name or Internet Protocol (IP) address of ESP device 804. The port is the port number provided when a publish/subscribe (pub/sub) capability is initialized by ESPE 1100. The engine name is the name of ESPE 1100. The engine name of ESPE 1100 and host/port to ESP device 804 may be read from a storage location on third computer-readable medium 1208, may be provided on a command line, or otherwise input to or defined by event publishing application 1222 as understood by a person of skill in the art.

In an operation 1302, publishing services are initialized.

In an operation 1304, the initialized publishing services are started, which may create a publishing client for the instantiated event publishing application 1222. The publishing client performs the various pub/sub activities for the instantiated event publishing application 1222. For example, a string representation of a URL to ESPE 1100 is passed to a "Start" function. For example, the URL may include the host:port designation of ESPE 1100 executing at ESP device 804, a project of the projects 1102, a continuous query of the continuous queries 1104, and a window of the source windows 1106. The "Start" function may validate and retain the connection parameters for a specific publishing client connection and return a pointer to the publishing client. For illustration, the URL may be formatted as "dfESP://<host>:<port>/<project name>/<continuous query name>/<source window name>". If event publishing application 1222 is publishing to more than one source window of ESPE 1100, the initialized publishing services may be started to each source window using the associated names (project name, continuous query name, source window name).

In an operation 1306, a connection is made between event publishing application 1222 and ESPE 1100 for each source window of the source windows 1106 to which any measurement data value is published. To make the connection, the pointer to the created publishing client may be passed to a "Connect" function. If event publishing application 1222 is publishing to more than one source window of ESPE 1100, a connection may be made to each started window using the pointer returned for the respective "Start" function call.

In an operation 1308, an event block object is created by event publishing application 1222.

In an operation 1310, the created event block object is published to ESPE 1100, for example, using the pointer returned for the respective "Start" function call to the appropriate source window. Event publishing application 1222 passes the created event block object to the created publishing client, where the unique ID field in the event block object has been set by event publishing application 1222 possibly after being requested from the created publishing client. In an illustrative embodiment, event publishing application 1222 may wait to begin publishing until a "Ready" callback has been received from the created publishing client. The event block object is injected into the source window, continuous query, and project associated with the started publishing client.

In an operation 1312, a determination is made concerning whether or not processing is stopped. When processing is not stopped, processing continues in operation 1308 to continue creating and publishing event block objects that include measurement data values. When processing is stopped, processing continues in an operation 1314.

In operation 1314, the connection made between event publishing application 1222 and ESPE 1100 through the created publishing client is disconnected, and each started publishing client is stopped.

Figure 14:
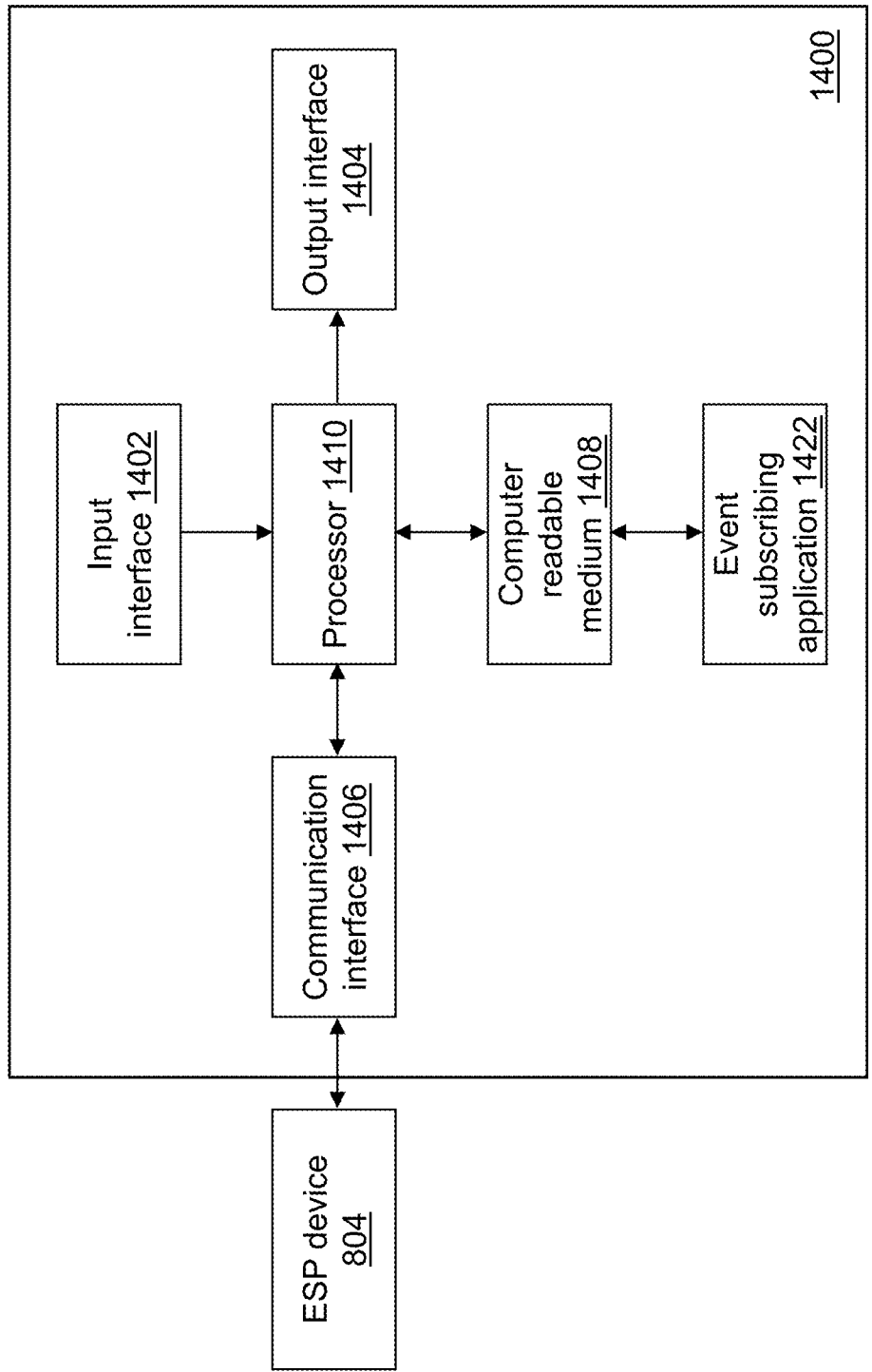
FIG. 14 depicts a block diagram of an event subscribing device of an event subscribing system of the ESP system of FIG. 8 in accordance with an illustrative embodiment.

Referring to FIG. 14, a block diagram of event subscribing device 1400 is shown in accordance with an example embodiment. Event subscribing device 1400 is an example computing device of event subscribing system 806. For example, each of smart phone 820, desktop 822, server computer 824, and laptop 826 may be an instance of event subscribing device 1400. Event subscribing device 1400 may include a fourth input interface 1402, a fourth output interface 1404, a fourth communication interface 1406, a fourth computer-readable medium 1408, a fourth processor 1410, and event subscribing application 1422. Fewer, different, and additional components may be incorporated into event subscribing device 1400. Each event subscribing device 1400 of event subscribing system 806 may include the same or different components or combination of components.

Fourth input interface 1402 provides the same or similar functionality as that described with reference to input interface 102 of data decomposition device 100 though referring to event subscribing device 1400. Fourth output interface 1404 provides the same or similar functionality as that described with reference to output interface 104 of data decomposition device 100 though referring to event subscribing device 1400. Fourth communication interface 1406 provides the same or similar functionality as that described with reference to communication interface 106 of data decomposition device 100 though referring to event subscribing device 1400. Data and messages may be transferred between event subscribing device 1400 and ESP device 804 using fourth communication interface 1406. Fourth computer-readable medium 1408 provides the same or similar functionality as that described with reference to computer-readable medium 108 of data decomposition device 100 though referring to event subscribing device 1400. Fourth processor 1410 provides the same or similar functionality as that described with reference to processor 110 of data decomposition device 100 though referring to event subscribing device 1400.

Figure 15:
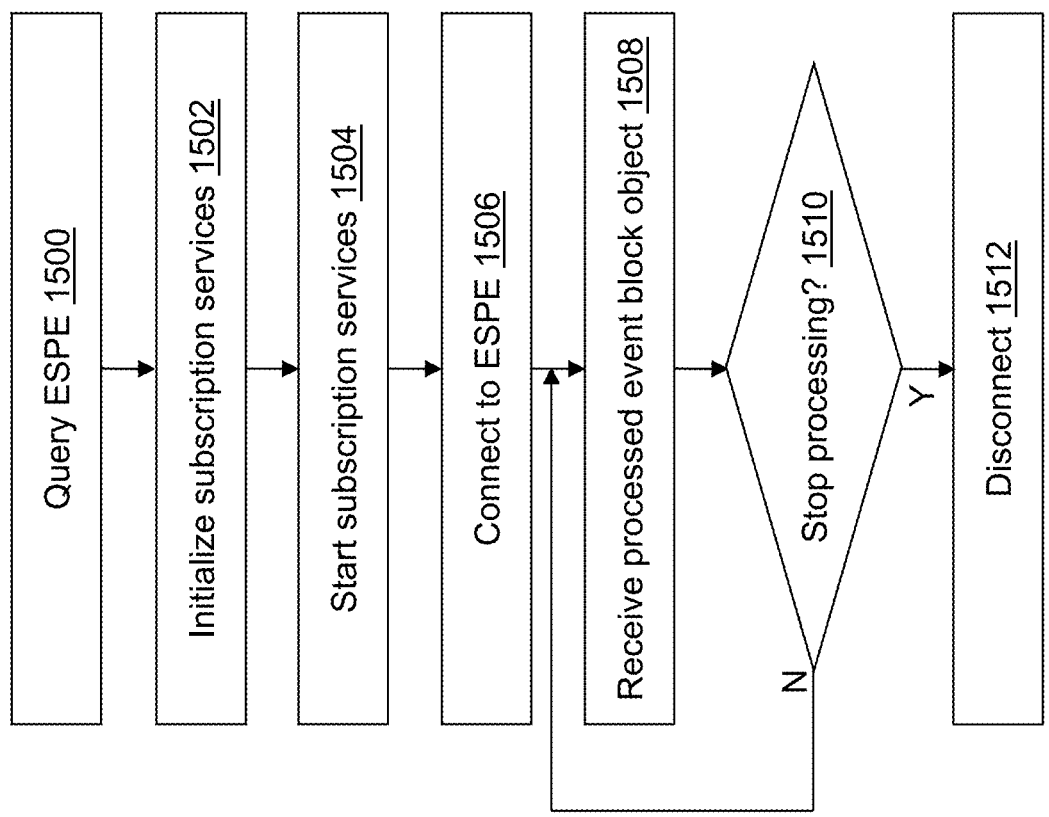
FIG. 15 depicts a flow diagram illustrating examples of operations performed by the event subscribing device of FIG. 9 in accordance with an illustrative embodiment.

Referring to FIG. 15, example operations associated with event subscribing application 1422 are described. Additional, fewer, or different operations may be performed depending on the embodiment. The order of presentation of the operations of FIG. 15 is not intended to be limiting.

Similar to operation 1300, in an operation 1500, ESPE 1100 is queried, for example, to discover names of projects 1102, of continuous queries 1104, of windows 1106, 1108, of window schema, and of window edges currently running in ESPE 1100. The host name of ESP device 804, the engine name of ESPE 1100, and the port number opened by ESPE 1100 are provided as an input to the query and a list of strings may be returned with the names to the projects 1102, continuous queries 1104, windows 1106, 1108, window schema, and/or window edges.

In an operation 1502, subscription services are initialized.

In an operation 1504, the initialized subscription services are started, which may create a subscribing client on behalf of event subscribing application 1422 at event subscribing device 1400. The subscribing client performs the various pub/sub activities for event subscribing application 1422. For example, a URL to ESPE 1100 may be passed to a "Start" function. The "Start" function may validate and retain the connection parameters for a specific subscribing client connection and return a pointer to the subscribing client. For illustration, the URL may be formatted as "dfESP://<host>:<port>/<project name>/<continuous query name>/<window name>".

In an operation 1506, a connection may be made between event subscribing application 1422 executing at event subscribing device 1400 and ESPE 1100 through the created subscribing client. To make the connection, the pointer to the created subscribing client may be passed to a "Connect" function and a mostly non-busy wait loop created to wait for receipt of event block objects.

In an operation 1508, the processed event block object is received by event subscribing application 1422 executing at event subscribing device 1400 as a result of operation 1026.

The received event block object is processed based on the operational functionality provided by event subscribing application 1422.

In an operation 1510, a determination is made concerning whether or not processing is stopped. If processing is not stopped, processing continues in operation 1508 to continue receiving and processing event block objects. If processing is stopped, processing continues in an operation 1512.

In operation 1512, the connection made between event subscribing application 1422 and ESPE 1100 through the subscribing client is disconnected, and the subscribing client is stopped.

The performance of ISVD application 122 was compared to a basic incremental SVD method (BSVD) and a power-method-based algorithm (PSVD) using synthetic and real datasets. BSVD is described in a paper by H. Zha and FID Simon titled *On updating problems in latent semantic indexing* and published in SIAM Journal on Scientific Computing volume 21(2) pages 782-791 in 1999. PSVD is described in a book by CD Meyer titled *Matrix analysis and applied linear algebra* and published in SIAM Journal on Scientific Computing volume 71 in 2000. All of the methods were implemented using the C language.

The method efficiency was measured for each method by recording the amount of time required to perform the computations on either one thread or four threads with different matrix sizes and ranks used in the process. Synthetic matrices with different numbers of columns were created for this purpose. The chosen numbers of columns was 10, 20, 50, 100, and 500. For each size, 50 full-rank random matrices were created, and the average run time was recorded. Two rank values were used: 10 and full rank (number of columns). The first 1000 rows of each dataset was used to run a batch SVD, and the SVD was truncated to have the required rank. The matrices were updated in the form of moving windows, which involved appending a row to the current window and then removing the first row of the window. The results for are shown in Table 1 below.

TABLE 1

| # Columns | Rank | BSVD | PSVD | 122 one thread | 122 four threads |
|---|---|---|---|---|---|
| 10 | 10 | 0.11 | 0.46 | 0.09 | 0.21 |
| 20 | 20 | 0.22 | 2.98 | 0.17 | 0.26 |
| 50 | 10 | 0.12 | 2.13 | 0.1 | 0.23 |
| 50 | 50 | 0.78 | 46 | 0.65 | 0.56 |
| 100 | 10 | 0.14 | 2.96 | 0.12 | 0.24 |
| 100 | 100 | 2.82 | 498 | 2.22 | 1.45 |
| 500 | 10 | 0.67 | 5.03 | 0.19 | 0.34 |
| 500 | 500 | 81 | N/A | 56 | 35 |

The BSVD column shows the better of running the BSVD method using one or four threads, and the PSVD column shows the better of running the PSVD method using one or four threads.

The method efficiency was measured for each method using real datasets. Two rank values were used: 10 and full rank (number of columns). The first 1000 rows of each dataset was used to run a batch SVD, and the SVD was truncated to have the required rank. The matrices were updated in the form of moving windows, which involved appending a row to the current window and then removing the first row of the window. The results for are shown in Table 1 below.

TABLE 2

| Dataset | Rank | BSVD | PSVD | 122 one thread | 122 four threads |
|---|---|---|---|---|---|
| HTTP(567479,3) | 3 | 21.49 | 14.75 | 12.91 | 13.03 |
| SMTP(95156,3 | 3 | 3.59 | 2.3 | 2.18 | 2.13 |
| Speech(3686,400) | 10 | 1.09 | 5.05 | 0.33 | 0.7 |
| Speech(3686,400) | 400 | 122.8 | N/A | 93.27 | 58.99 |
| Musk(3062,166) | 10 | 0.35 | 1.27 | 0.19 | 0.45 |
| Musk(3062,166) | 166 | 13.06 | N/A | 11.33 | 7.18 |
| Shuttle(49097,9) | 9 | 3.12 | 10.05 | 2.44 | 9.94 |
| Cover Type(286048,10) | 10 | 19.45 | 45.22 | 15.61 | 53.73 |
| Mammography(11183,6) | 6 | 0.5 | 1.73 | 0.41 | 1.85 |
| Satellite(6435,36) | 10 | 0.46 | 2.52 | 0.36 | 1.08 |
| Satellite(6435,36) | 36 | 2.32 | 153.7 | 1.94 | 1.92 |
| ANN Thyroid(7200,6) | 6 | 0.33 | 0.43 | 0.25 | 1.11 |

The BSVD column shows the better of running the BSVD method using one or four threads, and the PSVD column shows the better of running the PSVD method using one or four threads.

The results show that ISVD application 122 is faster than BSVD and PSVD in updating the matrices. ISVD application 122 utilizes the special matrix structures of arrowhead and DPR1 matrices in the pivotal part of the updating process. By updating the matrices effectively, the efficiency of the entire updating process is improved. Because the singular values are calculated independently of each other, ISVD application 122 benefits from parallelization and does not lose additional accuracy in the updating process relative to BSVD and PSVD. When the rank is low, ISVD application 122 using a single-thread is preferred because it has reduced overhead in creating and destroying threads. On the other hand, ISVD application 122 using four threads is more efficient when updating a high-rank matrix because computing each singular value and its corresponding singular vectors is independent of computing the others and the parallel processing benefits outweigh the additional overhead needed.

The target singular values have greater accuracy with higher rank in the updating process. Moreover, their corresponding singular vectors have less reconstruction error. ISVD application 122 can take advantage of this observation, because it is more efficient in computing a high-rank incremental SVD.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

compute a singular value decomposition (SVD) of a first matrix to define a left matrix, a diagonal matrix, and a right matrix, wherein the first matrix is defined as $A=U\Sigma V^T$, where A is the first matrix, U is the left matrix, V is the right matrix, $\Sigma$ is the diagonal matrix, T indicates a transpose, A has dimension $N_I \times N_v$, U has dimension $N_I \times N_v$, V has dimension $N_v \times N_v$, $\Sigma$ has dimension $N_v \times N_v$, $N_I$ is a predefined number of initialization observation vectors used to compute the SVD of the first matrix, and $N_v$ is a predefined number of variables of a plurality of variables that define each observation vector;

(A) select a next observation vector from an event stream or from a second plurality of observation vectors;

(B) update the left matrix, the diagonal matrix, and the right matrix using an arrowhead matrix structure defined from the diagonal matrix and based on adding the selected next observation vector to a last row of the first matrix;

(C) update the updated left matrix, the updated diagonal matrix, and the updated right matrix using a diagonal-plus-rank-one (DPR1) matrix structure defined from the updated diagonal matrix and based on removing an observation vector from a first row of the first matrix, wherein eigenpairs of the DPR1 matrix are computed based on whether a value computed from the updated left matrix is positive or negative;

(D) output the left matrix updated in (C), the diagonal matrix updated in (C), and the right matrix updated in (C); and (E) repeat (A) through (D) until the event stream is stopped or a last observation vector is selected from the second plurality of observation vectors in (A).

2. The non-transitory computer-readable medium of claim 1, wherein the left matrix updated in (C), the diagonal matrix updated in (C), and the right matrix updated in (C) are output each iteration as part of training a machine learning model.

3. The non-transitory computer-readable medium of claim 2, wherein, after (D), the computer-readable instructions further cause the computing device to:

execute the trained machine learning model with the selected next observation vector to predict a characteristic value for the selected next observation vector; and output the predicted characteristic value.

4. The non-transitory computer-readable medium of claim 2, wherein, after (E), the computer-readable instructions further cause the computing device to:

receive another observation vector; and execute the trained machine learning model with the received another observation vector to predict a characteristic value for the received another observation vector; and output the predicted characteristic value.

5. The non-transitory computer-readable medium of claim 1, wherein the left matrix updated in (C), the diagonal matrix updated in (C), and the right matrix updated in (C) are output each iteration as part of training a classification matrix.

6. The non-transitory computer-readable medium of claim 5, wherein, after (D), the computer-readable instructions further cause the computing device to:

predict a classification value for the selected next observation vector using the trained classification matrix; and output the predicted classification value.

7. The non-transitory computer-readable medium of claim 5, wherein, after (E), the computer-readable instructions further cause the computing device to:

receive another observation vector; and predict a classification value for the received another observation vector using the trained classification matrix; and output the predicted classification value.

8. The non-transitory computer-readable medium of claim 1, wherein the left matrix updated in (C), the diagonal matrix updated in (C), and the right matrix updated in (C) are output each iteration as part of successively computing the SVD of the first matrix with the selected next observation vector.

9. The non-transitory computer-readable medium of claim 1, wherein the left matrix updated in (C), the diagonal matrix updated in (C), and the right matrix updated in (C) are output each iteration as part of training a transformation matrix.

10. The non-transitory computer-readable medium of claim 9, wherein, after (D), the computer-readable instructions further cause the computing device to:

transform the selected next observation vector using the trained transformation matrix; and output the transformed, selected next observation vector.

11. The non-transitory computer-readable medium of claim 9, wherein the computer-readable instructions further cause the computing device to train a clustering model using transformed observation vectors to define a plurality of clusters.

12. The non-transitory computer-readable medium of claim 11, wherein, after (D), the computer-readable instructions further cause the computing device to:

transform the selected next observation vector using the trained transformation matrix;

assign the transformed, selected next observation vector to a cluster of the defined plurality of clusters; and output the assigned cluster.

13. The non-transitory computer-readable medium of claim 1, wherein the left matrix updated in (C), the diagonal matrix updated in (C), and the right matrix updated in (C) are output each iteration as part of computing a decomposition matrix.

14. The non-transitory computer-readable medium of claim 13, wherein the decomposition matrix is computed using a principal components decomposition method.

15. The non-transitory computer-readable medium of claim 1, wherein the computing device is executing an event stream processing engine that performs the computer-readable instructions.

16. The non-transitory computer-readable medium of claim 1, wherein before (B), the computer-readable instructions further cause the computing device to:

reduce the dimension of the left matrix to $N_I \times r$, where r is a predefined rank value and $r < N_v$;

reduce the dimension of the diagonal matrix to $r \times r$; and reduce the dimension of the right matrix to $N_v \times r$.

17. The non-transitory computer-readable medium of claim 16, wherein before (B), the computer-readable instructions further cause the computing device to reduce the dimension of the left matrix to $m \times r$, where m is a predefined number of rows and $m < N_I$.

18. The non-transitory computer-readable medium of claim 1, wherein the value computed from the updated left matrix is computed using a Schur decomposition.

19. The non-transitory computer-readable medium of claim 1, wherein the value computed from the updated left matrix is computed using a decomposition of a matrix defined using $H=[b^Tb, 1; 1,0]$, where $b=[y; \rho]$, $y=U'(1,:)^T$, $\rho=\|e_1-U'y\|_2$, $e_1$ is a vector with a zero for each vector value except a one for a first vector value, U' is the left matrix updated in (B), and $\| \|_2$ indicates a Euclidean norm computation.

20. The non-transitory computer-readable medium of claim 1, wherein computing the eigenpairs of the DPR1 matrix comprises:
(F) selecting a rank value;
(G) initializing a shift parameter value, a shift index, and a pole direction value based on the value computed from the updated left matrix and the selected rank value;
(H) computing an inverse of an arrowhead matrix based on the value computed from the updated left matrix and the initialized shift index;
(I) computing a leftmost or a rightmost eigenvalue for the selected rank value based on the initialized pole direction value;
(J) computing an eigenvector for the selected rank value using the updated diagonal matrix;
(K) shifting the computed eigenvector for the selected rank value using the initialized shift parameter value; and
(L) repeating (F) through (K) for each rank value from one to a predefined rank value, wherein each rank value is selected in (F) once.

21. The non-transitory computer-readable medium of claim 20, wherein each thread of a plurality of threads performs one or more iterations of (F) through (K) based on a start rank index and a stop rank index assigned to each respective thread of the plurality of threads so that each rank value from one to the predefined rank value is selected in (F) once by any thread of the plurality of threads.

22. The non-transitory computer-readable medium of claim 20, wherein when the selected rank value is one and the value computed from the updated left matrix is positive, the shift parameter value is initialized as $D^2(1,1)$, where $D=[\Sigma'; 0]$, $\Sigma'$ is the diagonal matrix updated in (B), the shift index is initialized as one, and the pole direction value is initialized to indicate the eigenvalue is on a right side of a nearest pole.

23. The non-transitory computer-readable medium of claim 22, wherein when the selected rank value is the predefined rank value and the value computed from the updated left matrix is negative, the shift parameter value is initialized as $D^2(r, r)$, where r is the predefined rank value, the shift index is initialized as r, and the pole direction value is initialized to indicate the eigenvalue is on a left side of the nearest pole.

24. The non-transitory computer-readable medium of claim 23, wherein, when the selected rank value is one and the value computed from the updated left matrix is negative, or when the selected rank value is the predefined rank value and the value computed from the updated left matrix is positive, or when the selected rank value is greater than one and less than the predefined rank value, initializing the shift parameter value, the shift index, and the pole direction value comprises:
computing a midpoint value based on the updated left matrix and the selected rank value;
when the computed midpoint value is greater than zero, initializing the shift parameter value as $D^2(i, i)$, where i is the selected rank value;
initializing the shift index as equal to the selected rank value;
initializing the pole direction value to indicate the eigenvalue is on the right side of the nearest pole when the value computed from the updated left matrix is positive; and
initializing the pole direction value to indicate the eigenvalue is on the left side of the nearest pole when the value computed from the updated left matrix is negative; and
when the computed midpoint value is less than or equal to zero,
initializing the shift parameter value as $D^2(i-s, i-s)$, where s is one when the value computed from the updated left matrix is positive, and s is negative one when the value computed from the updated left matrix is negative;
initializing the shift index as equal to i-s;
initializing the pole direction value to indicate the eigenvalue is on the left side of the nearest pole when the value computed from the updated left matrix is positive; and
initializing the pole direction value to indicate the eigenvalue is on the right side of the nearest pole when the value computed from the updated left matrix is negative.

25. The non-transitory computer-readable medium of claim 24, wherein the midpoint value is computed using $F_{mid}=1+\rho_1\Sigma((\bar{a}\odot\bar{a})\cdot/(diag(D^2)-D^2(i, i)-(D^2(i-sign, i-sign)/2)))$, where $F_{mid}$ is the midpoint value, $\rho_1$ is the value computed from the updated left matrix, a is computed using a Schur decomposition, $\odot$ indicates a dot product, $\cdot/$ indicates an elementwise division, and diag indicates a column vector that includes each diagonal element of D.

26. The non-transitory computer-readable medium of claim 24, wherein the midpoint value is computed using $F_{mid}=1+\rho_2 \Sigma((\hat{b}\odot\hat{b})\cdot/(diag(S_1)-S_1(i, i)-(S_1(i-s, i-s)/2)))$, where $F_{mid}$ is the midpoint value, $\rho_2$ is the value computed from the updated left matrix, $\hat{b}$ is computed using a Schur decomposition, $S_1$ is a diagonal matrix that includes each eigenvalue stored in an individual diagonal position, $\odot$ indicates a dot product, $\cdot/$ indicates an elementwise division, and diag indicates a column vector that includes each diagonal element of $S_1$.

27. The non-transitory computer-readable medium of claim 20, wherein the value computed from the updated left matrix is computed using a Schur decomposition.

28. The non-transitory computer-readable medium of claim 27, wherein the value computed from the updated left matrix is computed using a decomposition of a matrix defined using $H=[b^Tb, 1; 1,0]$, where $b=[y; \rho]$, $y=U'(1,:)^T$, $\rho=\|e_1-U'y\|_2$, $e_1$ is a vector with a zero for each vector value except a one for a first vector value, U' is the left matrix updated in (B), and $\| \|_2$ indicates a Euclidean norm computation.

29. A computing device comprising:
a processor; and
a non-transitory computer-readable medium operably coupled to the processor, the computer-readable medium having computer-readable instructions stored thereon that, when executed by the processor, cause the computing device to
compute a singular value decomposition (SVD) of a first matrix to define a left matrix, a diagonal matrix, and a right matrix, wherein the first matrix is defined as $A=U\Sigma V^T$, where A is the first matrix, U is the left matrix, V is the right matrix, $\Sigma$ is the diagonal matrix, T indicates a transpose, A has dimension $N_I \times N_v$, U has dimension $N_I \times N_v$, V has dimension $N_v \times N_v$, $\Sigma$ has dimension $N_v \times N_v$, $N_I$ is a predefined number of initialization observation vectors used to compute the SVD of the first matrix, and $N_v$ is a predefined number of variables of a plurality of variables that define each observation vector;

(A) select a next observation vector from an event stream or from a second plurality of observation vectors;

(B) update the left matrix, the diagonal matrix, and the right matrix using an arrowhead matrix structure defined from the diagonal matrix and based on adding the selected next observation vector to a last row of the first matrix;

(C) update the updated left matrix, the updated diagonal matrix, and the updated right matrix using a diagonal-plus-rank-one (DPR1) matrix structure defined from the updated diagonal matrix and based on removing an observation vector from a first row of the first matrix, wherein eigenpairs of the DPR1 matrix are computed based on whether a value computed from the updated left matrix is positive or negative;

(D) output the left matrix updated in (C), the diagonal matrix updated in (C), and the right matrix updated in (C); and (E) repeat (A) through (D) until the event stream is stopped or a last observation vector is selected from the second plurality of observation vectors in (A).

30. A method of computing a singular value decomposition of a matrix, the method comprising:

computing, by a computing device, a singular value decomposition (SVD) of a first matrix to define a left matrix, a diagonal matrix, and a right matrix, wherein the first matrix is defined as $A = U\Sigma V^T$, where A is the first matrix, U is the left matrix, V is the right matrix, $\Sigma$ is the diagonal matrix, T indicates a transpose, A has dimension $N_I \times N_v$, U has dimension $N_I \times N_v$, V has dimension $N_v \times N_v$, $\Sigma$ has dimension $N_v \times N_v$, $N_I$ is a predefined number of initialization observation vectors used to compute the SVD of the first matrix, and $N_v$ is a predefined number of variables of a plurality of variables that define each observation vector;

(A) selecting, by the computing device, a next observation vector from an event stream or from a second plurality of observation vectors;

(B) updating, by the computing device, the left matrix, the diagonal matrix, and the right matrix using an arrowhead matrix structure defined from the diagonal matrix and based on adding the selected next observation vector to a last row of the first matrix;

(C) updating, by the computing device, the updated left matrix, the updated diagonal matrix, and the updated right matrix using a diagonal-plus-rank-one (DPR1) matrix structure defined from the updated diagonal matrix and based on removing an observation vector from a first row of the first matrix, wherein eigenpairs of the DPR1 matrix are computed based on whether a value computed from the updated left matrix is positive or negative;

(D) outputting, by the computing device, the left matrix updated in (C), the diagonal matrix updated in (C), and the right matrix updated in (C); and (E) repeating, by the computing device, (A) through (D) until the event stream is stopped or a last observation vector is selected from the second plurality of observation vectors in (A).

* * * * *

UNITED STATES PATENT AND TRADEMARK OFFICE
CERTIFICATE OF CORRECTION

PATENT NO. : 11,314,844 B1
APPLICATION NO. : 17/504634
DATED : April 26, 2022
INVENTOR(S) : Hansi Jiang Page 1 of 1

It is certified that error appears in the above-identified patent and that said Letters Patent is hereby corrected as shown below:

In the Specification

Column 11, Line 3:
Delete the phrase "$D = \Sigma^2, z = -v = \Sigma x, a = \rho + x^T x$, and $k = i$." and replace with
--$D = \Sigma^2, z = v = \Sigma x, \alpha = \rho + x^T x$, and $k = i$.--.

Column 11, Lines 5-6:
Delete the phrase "$Q = [D, v; v^T, a]$." and replace with --$Q = [D, v; v^T, \alpha]$.--.

Column 13, Line 30:
Delete the phrase "where a is" and replace with --where $\sigma$ is--.

Column 15, Line 13:
Delete the phrase "where and $D_2$ are matrices," and replace with --where $D_1$ and $D_2$ are matrices,--.

In the Claims

Claim 25, Column 32, Line 31:
Delete the phrase "a is computed" and replace with --$\bar{a}$ is computed--.

Signed and Sealed this
Eleventh Day of October, 2022

Katherine Kelly Vidal
*Director of the United States Patent and Trademark Office*